US008773415B2

(12) United States Patent
Omori et al.

(10) Patent No.: US 8,773,415 B2
(45) Date of Patent: Jul. 8, 2014

(54) DISPLAY DEVICE WITH IMAGE PICKUP FUNCTION, DRIVING METHOD, AND ELECTRONIC DEVICE

(75) Inventors: Hideyuki Omori, Aichi (JP); Go Yamanaka, Kanagawa (JP); Michiru Senda, Aichi (JP); Yoshiharu Nakajima, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 818 days.

(21) Appl. No.: 12/917,915

(22) Filed: Nov. 2, 2010

(65) Prior Publication Data

US 2011/0109605 A1      May 12, 2011

(30) Foreign Application Priority Data

Nov. 12, 2009   (JP) ................... P2009-258942

(51) Int. Cl.
*G09G 5/00*    (2006.01)
(52) U.S. Cl.
USPC .......................................................... 345/207
(58) Field of Classification Search
USPC ................ 345/87–90, 55, 204–207, 173, 175
See application file for complete search history.

(56) References Cited

U.S. PATENT DOCUMENTS

| | | | | |
|---|---|---|---|---|
| 5,485,177 A | | 1/1996 | Shannon et al. | |
| 6,333,729 B1 * | | 12/2001 | Ha ................................... | 345/98 |
| 7,522,149 B2 * | | 4/2009 | Nakamura et al. ............. | 345/104 |
| 7,612,818 B2 * | | 11/2009 | Nakamura et al. ............. | 348/308 |
| 8,115,752 B2 * | | 2/2012 | Ijima et al. ..................... | 345/175 |
| 2006/0033729 A1 * | | 2/2006 | Yoshida et al. ................ | 345/207 |
| 2006/0262056 A1 * | | 11/2006 | Masutani et al. ................ | 345/87 |
| 2007/0132620 A1 * | | 6/2007 | Nakamura ...................... | 341/144 |
| 2007/0132710 A1 * | | 6/2007 | Tateuchi et al. ............... | 345/102 |
| 2008/0186289 A1 * | | 8/2008 | Ijima et al. ..................... | 345/175 |
| 2009/0141332 A1 * | | 6/2009 | Futatsuya et al. ............. | 359/276 |
| 2009/0310007 A1 | | 12/2009 | Matsui et al. | |
| 2011/0149174 A1 | | 6/2011 | Maeda et al. | |

FOREIGN PATENT DOCUMENTS

| | | |
|---|---|---|
| JP | 04-343387 | 11/1992 |
| JP | 05-056213 | 3/1993 |
| JP | 09-247536 | 9/1997 |
| JP | 10-285466 | 10/1998 |
| JP | 2004-336823 | 11/2004 |
| JP | 2008-205870 | 9/2008 |
| WO | 2010/026830 | 3/2010 |

* cited by examiner

*Primary Examiner* — Jason Mandeville
(74) *Attorney, Agent, or Firm* — K&L Gates LLP

(57) ABSTRACT

A display device with an image pickup function includes: a plurality of pixel signal lines each supplied with a pixel signal; a plurality of display pixels each performing a display operation based on the pixel signal; and a plurality of image pickup elements each including a photo-detector and a capacitor, the photo-detector generating a current of a magnitude corresponding to a photo-detection amount, the capacitor performing a discharging operation which follows a charging operation with the current from the photo-detector to output a charged voltage for a read operation. In the display device, a voltage level of the pixel signal line during the discharging operation is equal to a voltage level of the pixel signal line during the reading operation.

4 Claims, 19 Drawing Sheets

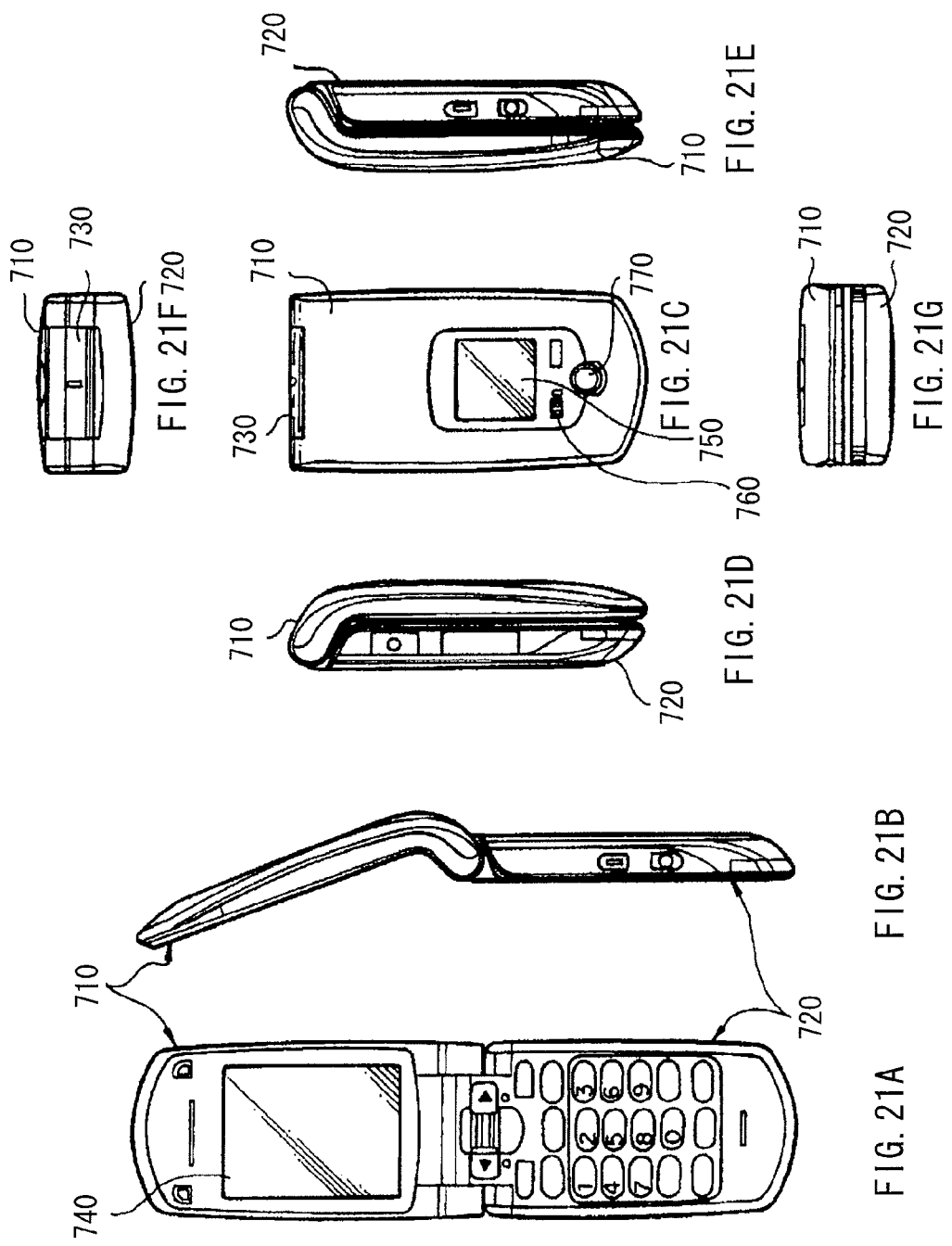

DISPLAY DEVICE WITH IMAGE PICKUP FUNCTION, DRIVING METHOD, AND ELECTRONIC DEVICE

CROSS REFERENCES TO RELATED APPLICATIONS

The present application claims priority to Japanese Priority Patent Application JP 2009-258942 filed in the Japan Patent Office on Nov. 12, 2009, the entire contents of which is hereby incorporated by reference.

BACKGROUND

The present application relates to a display device which incorporates an image pickup function for optically detecting an external proximity object, a method of driving the same, and an electronic device including the same.

In recent years, a display device in which information input is enabled has attracted attention. In this display device, a touch detecting function detecting a contact of a finger or the like is equipped in a display device such as a liquid crystal display device, and various button images are displayed on that display device, instead of using typical mechanical buttons. In the display device having such a touch detecting function, since an input device such as a keyboard, a mouse, and a keypad is not necessary, there is a tendency that use of the display device is expanded in a portable information terminal such as a portable phone in addition to a computer.

There are several methods in touch detecting methods, and one of them is an optical method. In the display device having such an optical touch detecting function, for example, there is a display device in which light emitted from the display device, and reflected by the external proximity object in the vicinity of a display surface is detected by a photo-detector incorporated in the display device, and the external proximity object is detected based on a light amount. For example, in Japanese Unexamined Patent Publication No. 2008-205870, the display device which incorporates the image pickup function is proposed. In that image pickup function, a photoelectric conversion element is used as the photo-detector, and electric charges supplied from the photoelectric conversion element are stored for charging in a capacitor during a predetermined period, thereby detecting the external proximity object based on the amount of electric charges.

SUMMARY

However, in the display device incorporating the above-described image pickup function, for example, there is a risk that a so-called crosstalk noise is mixed into an image pickup element (capacitor) from wiring or the like which transmits a display signal, through a parasitic capacity. In this case, the S/N ratio of a touch detecting signal obtained from an output signal of the image pickup element, and corresponding to the existence of the external proximity object is deteriorated. Therefore, for example, there is a risk that the sensitivity of a touch sensor to the external proximity object is changed depending on a display image. Alternatively, even when the external proximity object is not existed, there is a risk of malfunction that the touch sensor is reacted according to content of the display image, or the like.

To suppress the influence of such a crosstalk noise, for example, the method in which the image pickup element and signal wiring are shielded is considered. However, in this case, since the external proximity object is detected through a shield, there is a risk that the sensitivity of the touch sensor is deteriorated, and there is a risk that the power consumption of a drive circuit is increased due to the parasitic capacity of the signal wiring. Further, since the thickness of the display device itself is increased by adding the shield, there is a risk that the size reduction becomes difficult. Therefore, in the display device incorporating the image pickup element, it is desirable to minimize an adverse effect to the image pickup element caused by the crosstalk noise, without newly providing the shield. In other words, it is desirable to improve the resistance to the crosstalk noise.

In view of the foregoing, it is desirable to provide a display device with an image pickup function capable of minimizing an adverse effect given to an operation of a touch sensor by a display signal acting as a noise while the device size and the power consumption are suppressed from increasing, a driving method, and an electronic device.

According to an embodiment, there is provided a display device with an image pickup function including: a plurality of pixel signal lines each supplied with a pixel signal; a plurality of display pixels each performing a display operation based on the pixel signal; and a plurality of image pickup elements. Each of the plurality of image pickup elements includes a photo-detector and a capacitor, the photo-detector generating a current of a magnitude corresponding to a photo-detection amount, the capacitor performing a discharging operation which follows a charging operation with the current from the photo-detector to output a charged voltage for a read operation. Control is performed so that a voltage level of the pixel signal line during the discharging operation is equal to a voltage level of the pixel signal line during the reading operation.

According to another embodiment, there is provided a method of driving a display device with an image pickup function. The method includes steps of, when the display device with the image pickup function having the above-described structure is driven, in the individual image pickup elements, performing a discharging operation of the capacitor which follows a charging operation of the capacitor with the current to output a charged voltage for a read operation, the current being supplied from the photo-detector in response to photo-detection, and performing control so that a voltage level of the pixel signal line during the discharging operation is equal to a voltage level of the pixel signal line during the reading operation.

According to another embodiment, there is provided an electronic device including: the above-described display device with the image pickup function of the present application, and the electronic device corresponds to, for example, a television device, a digital camera, a personal computer, a video camera, or a mobile terminal device such as a mobile phone.

In the display device with the image pickup function, the method of driving the same, and the electronic device according to the an embodiment, light corresponding to an existence of an external proximity object is incident on the image pickup element. The photo-detector in the image pickup element generates the current of the magnitude corresponding to the photo-detection amount, and the charging operation to the capacitor is performed with that current. This charging operation is started after the discharging operation of the capacitor, and electric charges charged to the capacitor is read as the voltage after a passage of a predetermined time. This read voltage has a value corresponding to the existence of the external proximity object, and the external proximity object is detected based on a voltage difference of the capacitor between the discharging operation and the reading operation.

At that time, when a display signal for the display operation is applied to the pixel signal line, a crosstalk noise caused by the display signal is mixed from the pixel signal line to the image pickup element (capacitor). However, since the signals having the voltage levels equal to each other are applied to the pixel signal line during the discharging operation and the reading operation of the capacitor, amounts of the crosstalk noise from the pixel signal line to the image pickup element are approximately equal to each other during the discharging operation and the reading operation. As a result, influence of the crosstalk noise is approximately canceled in both the discharging operation and the reading operation, and the voltage difference of the detected capacitor is suppressed from changing by being influenced by the display signal.

The display pixel may be driven, for example, by a horizontal line sequential drive. In this case, the discharging operation is performed in a certain horizontal blanking period, and the reading operation is desirably performed in the different horizontal blanking period after the passage of the predetermined period of a display operation period over one or a plurality of horizontal lines.

For example, in the case where the display is performed by using a time-divisionally multiplexed signal in which the pixel signals are time-divisionally multiplexed, by providing a plurality of first switching elements, and turning on/off the plurality of first switching elements, the individual pixel signals are demultiplexed from the supplied time-divisionally multiplexed signal, and these pixel signals are supplied to the plurality of pixel signal lines, respectively.

As a specific example to equal the voltage levels of the pixel signal lines during the discharging operation and the reading operation, for example, the following two methods may be used. In a first method, a signal including a period of a predetermined-level voltage in a timing position which is synchronized with the horizontal blanking period is used as the time-divisionally multiplexed signal to be supplied, and all the first switching elements turn on in the horizontal blanking period, and therefore the predetermined-level voltage is supplied to all the plurality of pixel signal lines. In this method, the voltage levels of all the pixel signal lines are equal to each other in all the horizontal blanking periods. As a result, the voltage levels of the pixel signal lines are equal to each other during the discharging operation and the reading operation.

In a second method, a plurality of second switching elements which may turn on/off a supply of a predetermined signal are provided, all the first switching elements turn off, and all the second switching elements turn on in the horizontal blanking period, and therefore the predetermined-level signal is applied to all the plurality of pixel signal lines. A DC level signal having a constant voltage level is utilized as the predetermined signal. Also in this method, in the same manner as the above-described first method, the voltage levels of all the pixel signal lines are equal to each other in all the horizontal blanking periods. As a result, the voltage levels of the pixel signal lines are equal to each other during the discharging operation and the reading operation. In addition, as the predetermined signal, an existing signal (for example, a common signal applied to a common electrode (opposite electrode) in the polarity inversion drive of a liquid crystal display device) having the same voltage level during the discharging operation and the reading operation may be used.

According to the display device with the image pickup function, the method of driving the same, and the electronic device of the an embodiment, since the voltage levels applied to the pixel signal lines are set to be equal to each other during the discharging operation and the reading operation of the image pickup element, it may be possible to minimize an adverse effect given to an operation of a touch sensor by a display signal acting as a noise, while the device size and the power consumption are suppressed from increasing.

Additional features and advantages are described herein, and will be apparent from the following Detailed Description and the figures.

BRIEF DESCRIPTION OF THE FIGURES

FIGS. 21A to 21G are elevation views, side views, top face views, and bottom face views illustrating the appearance structure of a fifth application example.

DETAILED DESCRIPTION

Figure 1:
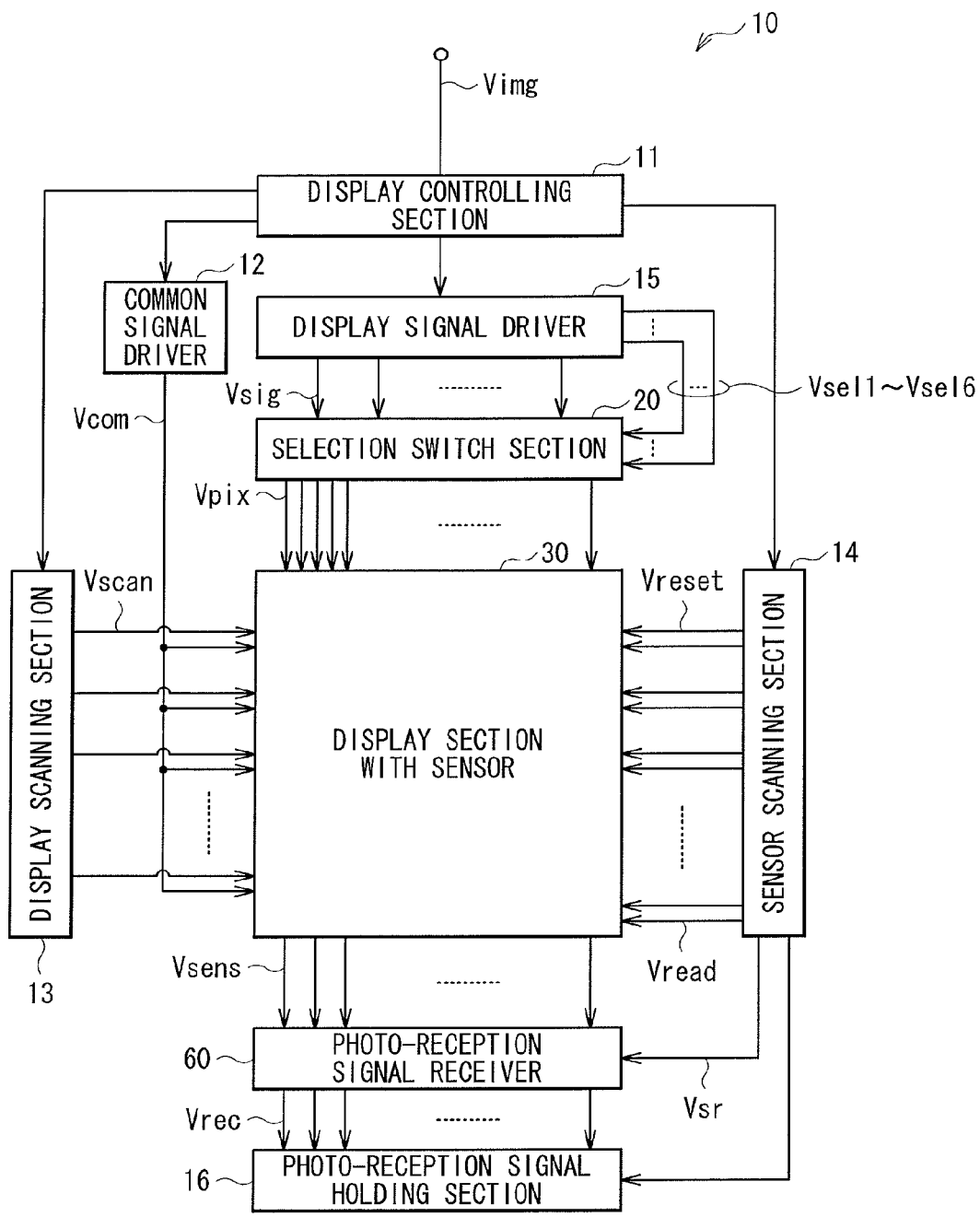
FIG. 1 is a block diagram illustrating a structural example of a display device with a touch sensor according to a first embodiment.
Figure 2:
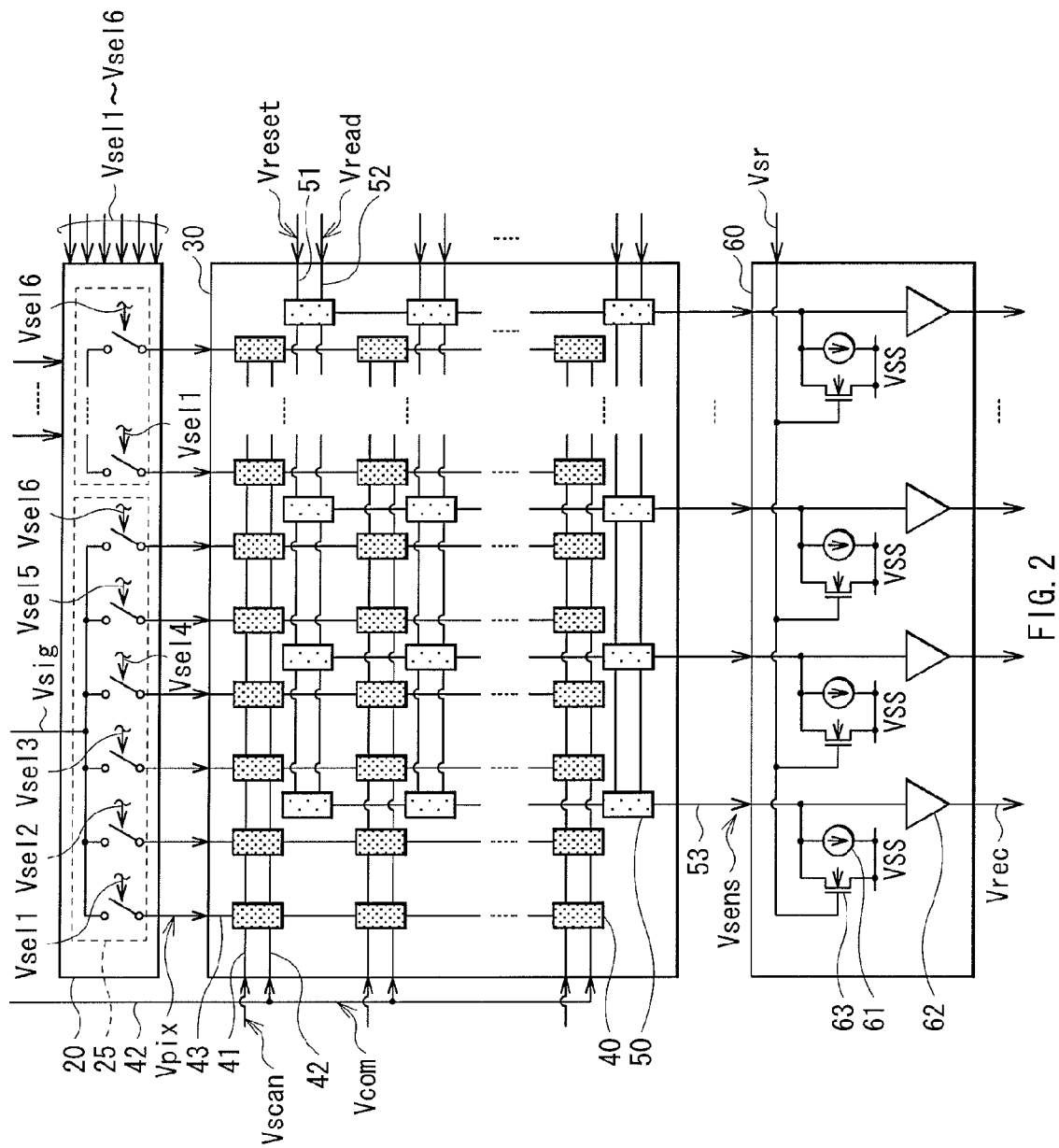
FIG. 2 is a block diagram illustrating a structural example of a main part of the display device with the touch sensor illustrated in FIG. 1.

Embodiments of this application will be described below with reference to the drawings. The description will be made in the following order.
1. First embodiment
2. Second embodiment
3. Third embodiment
4. Application examples
1. First embodiment Structural Example FIG. 1 illustrates a structural example of a display device with a touch sensor according to a first embodiment. FIG. 2 illustrates a detailed structure of a part of the display device with the touch sensor according to the first embodiment. Since a driving method of the display device with the touch sensor according to the an embodiment is realized by the first embodiment, the driving method will be described at the same time. This display device displays an image, and has a touch sensor function detecting an external proximity object. The display device uses a liquid crystal display element as a display element, and incorporates a photodiode as a touch sensor element, thereby constituting a display device with an in-cell type optical touch sensor.

A display device 10 with a touch sensor includes a display controlling section 11, a common signal driver 12, a display scanning section 13, a sensor scanning section 14, a display signal driver 15, a selection switch section 20, a display section 30 with a sensor, a photo-reception signal receiver 60, and a photo-reception signal holding section 16.

The display controlling section 11 stores and holds a supplied image signal Vimg for each screen (each display of one field) in a field memory composed of a SRAM (static random access memory) or the like. Further, the display controlling section 11 has a function to control the common signal driver 12, the display scanning section 13, the sensor scanning section 14, and the display signal driver 15, which drive the display section 30 with a sensor, to operate in conjugation with each other. Specifically, the display controlling section 11 supplies a common signal timing control signal to the common signal driver 12, supplies a display scanning timing control signal to the display scanning section 13, supplies a sensor scanning timing control signal to the sensor scanning section 14, and supplies an image signal of one horizontal line (one display horizontal line) based on the image signal held in the field memory, and a display timing control signal to the display signal driver 15.

The common signal driver 12 is a circuit supplying a common signal Vcom to the display section 30 with the sensor in response to the common signal timing control signal supplied from the display controlling section 11. Specifically, as will be described later, the common signal driver 12 supplies the common signal Vcom to each display cell 40 of the display section 30 with the sensor through a common signal line 42. In this example, the display cell 40 performs the display operation by a line inversion drive. Specifically, the common signal driver 12 inverts and outputs the common signal Vcom for each horizontal blanking period.

The display scanning section 13 has a function to select the display cells 40 to be displayed in the display section 30 with the sensor in response to the display scanning timing control signal supplied from the display controlling section 11. Specifically, as will be described later, the display scanning section 13 supplies a display scanning signal Vscan to the display cell 40 through a display scanning signal line 41, and thereby selecting, as the target of the display drive, one line in the display cells 40 formed in a matrix in the display section 30 with the sensor. Then, in these display cells 40, one display horizontal line is displayed in response to a pixel signal Vpix (will be described later) supplied from the selection switch section 20. In this manner, the display scanning section 13 time-divisionally sequentially scans the display horizontal lines one by one, and controls the display device 10 with the touch sensor to display the image.

The sensor scanning section 14 has a function to select, as the target of the touch sensor operation, sensor cells 50 in the display section 30 with the sensor in response to the sensor scanning timing control signal supplied from the display controlling section 11. Specifically, as will be described later, first, the sensor scanning section 14 supplies a reset signal Vreset to the sensor cell 50 through a reset signal line 51 in the horizontal blanking period, and thereby selecting one line (one sensor horizontal line) as the target of the reset operation in the sensor cells 50 formed in a matrix in the display section 30 with the sensor to discharge the capacitors 55 of those sensor cells 50. The capacitor 55 is charged by a current from a photodiode 54 (will be described later) in response to the existence of the external proximity object. Thereafter, the sensor scanning section 14 supplies a read signal Vread to these sensor cells 50 through a read signal line 52 in the horizontal blanking period which is different from the above-described horizontal blanking period, and thereby selecting these sensor cells 50 as the target of the reading operation. In other words, the time from when the reset signal Vreset is supplied until when the read signal Vread is supplied corresponds to a charging time (accumulated time Tstr) of the capacitor 55 in response to the existence of the external proximity object, and this time is arbitrarily set. From the sensor cells 50 constituting one sensor horizontal line, a voltage corresponding to a sensor capacitance voltage Vcap charged to each of the capacitors 55 is output as a sensor signal Vsens to the sensor signal line 53. In this manner, the sensor scanning section 14 time-divisionally sequentially scans the sensor horizontal lines one by one, and controls the display device 10 with the touch sensor to detect the external proximity object.

The sensor scanning section 14 also has a function to operate in conjugation with the photo-reception signal receiver 60 and the photo-reception signal holding section 16. Specifically, the sensor scanning section 14 supplies a sensor signal line reset signal Vsr to the photo-reception signal receiver 60, and supplies a photo-reception timing control signal to the photo-reception signal holding section 16.

Based on the image signal of one display horizontal line supplied from the display controlling section 11, the display signal driver 15 divides the image signal into a plurality of groups, and supplies each group as a display signal Vsig which is a time-divisionally multiplexed signal to the selection switch section 20. In this example, as will be described later, the image signal of one display horizontal line is grouped into a plurality of groups each including six image signals. Each of the six image signal corresponds to one of six display cells 40. Therefore, the display signal Vsig is composed. In other words, in each display signal Vsig, Each of the six image signal corresponding to one of six display cells 40 is time-divisionally multiplexed. Further, the display signal driver 15 generates switch control signals Vsel1 to Vsel6 which are necessary for demultiplexing the image signal (pixel signal Vpix) of each display cell 40 from the multiplexed display signal Vsig, and supplies the switch control signals Vsel1 to Vsel6 and the display signal Vsig to the selection switch section 20. This grouping is intended to reduce the number of wiring between the display signal driver 15 and the selection switch section 20. Therefore, the number of the pixel signals multiplexed in each display signal Vsig is not limited to six. Further, for example, by encoding the switch control signals Vsel1 to Vsel6, the number of the control signals may be reduced.

Further, the display signal driver 15 has a function (precharge function) to output a predetermined voltage as the display signal Vsig in the horizontal blanking period prior to the display period. Specifically, as will be described later, the display signal driver 15 outputs a predetermined precharge voltage Vpcg as the display signal Vsig in the horizontal blanking period, and, at the same time, controls and outputs the switch control signals Vsel1 to Vsel6 to turn on all the switches in the selection switch section 20. Therefore, the display signal driver 15 controls the selection switch section 20 to previously supply the precharge voltage Vpcg to all pixel signal lines 43 in the horizontal blanking period prior to the display period.

Based on the display signal Vsig and the switch control signals Vsel1 to Vsel6 which are supplied from the display signal driver 15, the selection switch section 20 demultiplexes the pixel signals Vpix time-divisionally multiplexed in the display signal Vsig from the display signal Vsig, and supplies the pixel signal Vpix to each display cell 40 as the target of the display drive in the display section 30 with the sensor. As illustrated in FIG. 2, the selection switch section 20 includes a plurality of switch groups 25. In this example, each of the switch groups 25 is formed of six switches. In each switch, one end is connected to one end of the other switch, and supplied with the display signal Vsig from the display signal driver 15. The other end is connected to the pixel signal line 43 (will be described later) of the display section 30 with the sensor. The six switches are controlled to turn on/off by the switch control signals Vsel1 to Vsel6 supplied from the display signal driver 15, respectively. With this structure, the selection switch section 20 time-divisionally sequentially turns on the six switches in response to the switch control signals Vsel1 to Vsel6, thereby functioning to demultiplex the pixel signals Vpix from the multiplexed display signal Vsig. The selection switch section 20 supplies the pixel signals Vpix to each of the display cells 40 constituting one display horizontal line which is selected by the display scanning section 13, through the pixel signal line 43, respectively.

Further, the selection switch section 20 supplies the precharge voltage Vpcg supplied from the display signal driver 15 to the pixel signal line 43 (will be described later) of the display section 30 with the sensor in the horizontal blanking period prior to the display period. Specifically, in the horizontal blanking period, the selection switch section 20 turns on all the switches, based on the switch control signals Vsel1 to Vsel6 supplied from the display signal driver 15. Therefore, the precharge voltage Vpcg included in the display signal Vsig which is supplied from the display signal driver 15 is supplied to all the pixel signal lines 43 of the display section 30 with the sensor.

In addition, for example, the selection switch section 20 is formed on the same substrate as the display section 30 with the sensor which will be described later. In that case, all the switches of the selection switch section 20 are composed of thin film transistors (TFTs) or the like, and are composed of analogue switches or the like using these TFTs.

The display section 30 with the sensor displays an image based on the pixel signal Vpix supplied from the selection switch section 20. The display section 30 with the sensor also has a function to detect the external proximity object on a touch detection face as being a surface of the display section 30 with the sensor. Hereinafter, with reference to FIGS. 2 to 4, structural examples of the display section 30 with the sensor will be described.

Figure 3:
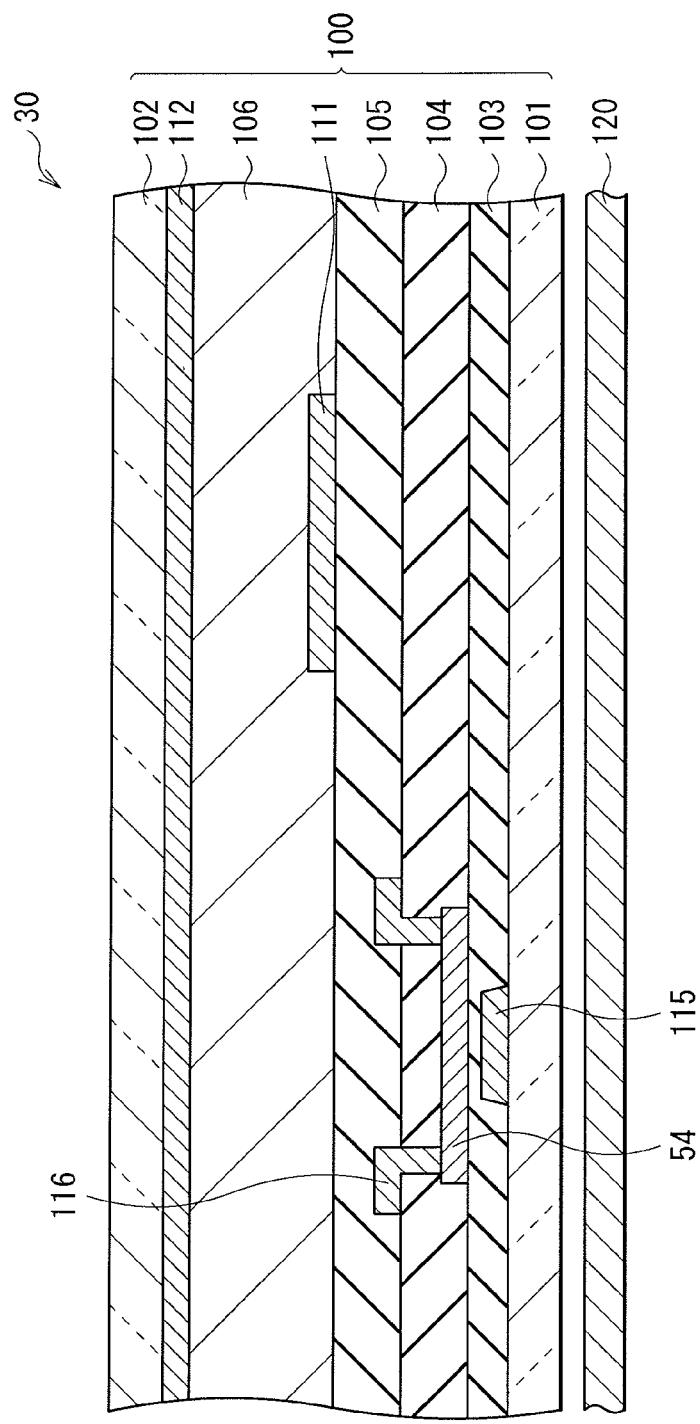
FIG. 3 is a cross-sectional view illustrating a part of the structure of a display section with a sensor illustrated in FIG. 1.
Figure 4:
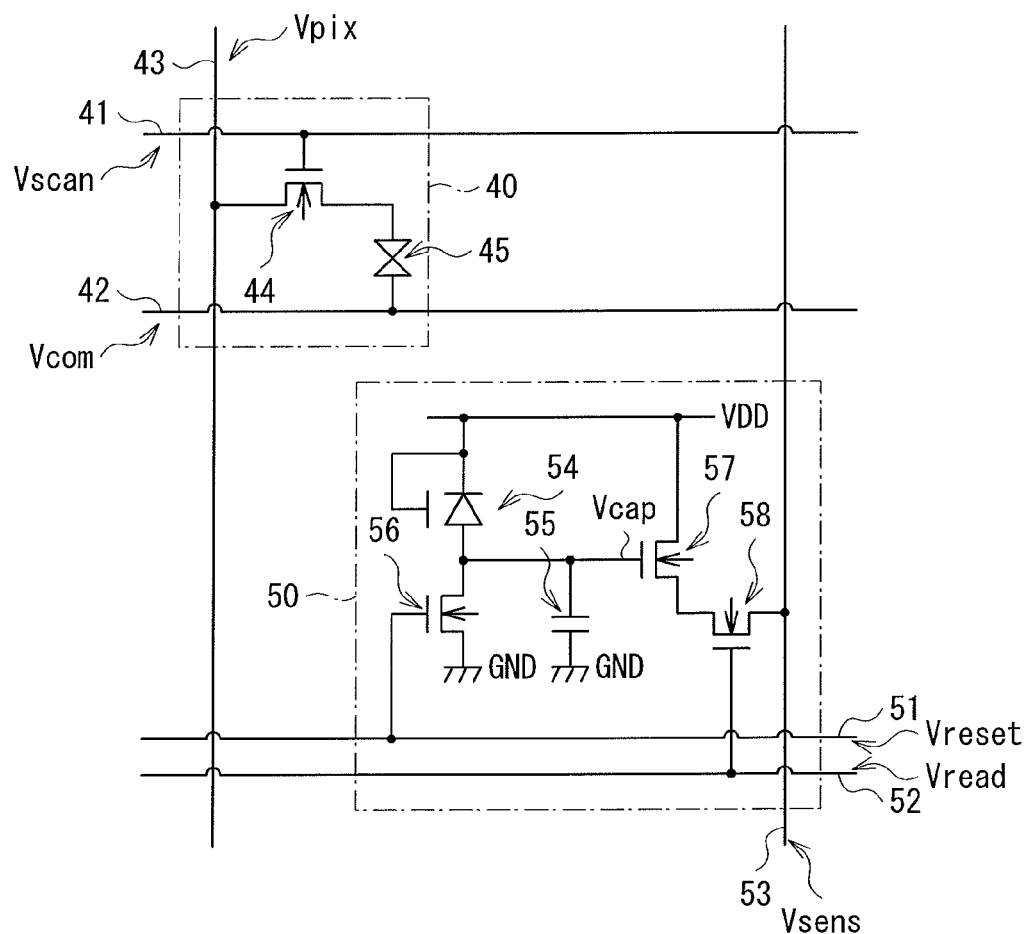
FIG. 4 is a circuit view illustrating a structural example of a display cell and a sensor cell illustrated in FIG. 2.

FIG. 3 illustrates an enlarged cross-sectional view of a part of the display section 30 with the sensor. FIG. 4 illustrates a circuit structural example of the display cell 40 and the sensor cell 50 of the display section 30 with the sensor.

As illustrated in FIG. 3, the display section 30 with the sensor is composed of a liquid crystal panel 100 and a backlight 120. The liquid crystal panel 100 includes transparent substrates 101 and 102, a liquid crystal layer 106, a pixel electrode 111, a common electrode 112, and a photodiode 54.

The transparent substrates 101 and 102 are arranged to face each other and to be apart from each other, and insulating layers 103, 104, and 105 are formed in this order on a face of the transparent substrate 101 on the transparent substrate 102 side. The pixel electrode 111 is formed on a part of the insulating layer 105, and the pixel signal Vpix supplied from the selection switch section 20 is applied to the pixel electrode 111. The common electrode 112 is formed on a face of the transparent substrate 102 on the transparent substrate 101 side, and the common signal Vcom supplied from the common signal driver 12 is applied to the common electrode 112. The liquid crystal layer 106 is provided between the insulating layer 105 on which the pixel electrode 111 is formed, and the common electrode 112. The backlight 120 is a light source emitting backlight light which is used when the image is displayed. Further, the backlight 120 functions as a light source emitting light for detecting (detection light, for example, invisible light such as infrared light) the external proximity object which will be described later. With this structure, the display section 30 with the sensor modulates the liquid crystal layer 106 provided between the pixel electrode 111 and the common electrode 112 based on the pixel signal Vpix and the common signal Vcom, and modulates the light amount of the backlight light emitted from the backlight 120, thereby displaying the image.

The photodiode 54 is formed in a part between the insulating layers 103 and 104, and a light shielding metal sensor gate 115 is formed between the transparent substrate 101 and the insulating layer 103 below the photodiode 54. Further, in the insulating layers 104 and 105, a metal wiring 116 connected to the photodiode 54 is formed so as to surround the circumference of the photodiode 54. With this structure, the light from the surface of the display section 30 with the sensor serving as the touch detection face, that is, the light from the direction of the transparent substrate 102 is incident on the photodiode 54. In other words, when the external proximity object is in contact with or adjacent to the touch detection face, the detection light emitted from the backlight 120 is reflected by the external proximity object, and the reflection light is detected in the photodiode 54. The display section 30 with the sensor functions as an optical touch sensor by detecting the external proximity object based on the light amount of the reflection light.

As illustrated in FIG. 2, in the display section 30 with the sensor, the display cells 40 performing the display, and the sensor cells 50 functioning as the touch sensors are arranged in a matrix. In this example, although the one sensor cell 50 is arranged to the two display cells 40 in the row direction, it is not limited to this. In other words, for example, the one sensor cell 50 may be arranged to the three or more display cells 40, or the display cells 40 and the sensor cells 50 may be arranged at a ratio of 1:1. In this example, although the display cells 40 and the sensor cells 50 are arranged at the ratio of 1:1 in the column direction, in the same manner as the above-described case of the row direction, it is not limited to this.

As illustrated in FIG. 2, in the display section 30 with the sensor, each display cell 40, and the other display cell 40 which belong to the same row of the display section 30 with the sensor are connected to each other by the display scanning signal line 41 and the common signal line 42. The display scanning signal line 41 is connected to the display scanning section 13, and the display scanning signal Vscan is supplied from the display scanning section 13 to the display scanning signal line 41. The common signal line 42 is connected to the common signal driver 12, and the common signal Vcom is supplied from the common signal driver 12 to the common signal line 42. Each display cell 40 is connected to the other display cell 40 which belong to the same column of the display section 30 with the sensor, by the pixel signal line 43. The pixel signal line 43 is connected to the selection switch section 20, and the pixel signal Vpix is supplied from the selection switch section 20 to the pixel signal line 43.

As illustrated in FIG. 4, the display cell 40 includes a transistor 44 and a liquid crystal element 45. The transistor 44 is composed of a TFT or the like, and is composed of an n-channel MOS (metal oxide semiconductor) TFT in this example. In the transistor 44, its source is connected to the pixel signal line 43, its gate is connected to the display scanning signal line 41, and its drain is connected to the liquid crystal element 45. In the liquid crystal element 45, one end is connected to the drain of the transistor 44, and the other end is connected to the common signal line 42. With this structure, in the display cell 40, when the transistor 44 is turned on by the display scanning signal Vscan of the display scanning signal line 41, the pixel signal Vpix of the pixel signal line 43 is supplied to one end of the liquid crystal element 45. The liquid crystal element 45 changes the polarizing direction based on the potential difference of this pixel signal Vpix and the common signal Vcom, and modulates the light amount of the light from the backlight 120.

As illustrated in FIG. 2, in the display section 30 with the sensor, each sensor cell 50, and the other sensor cell 50 which belong to the same row of the display section 30 with the sensor are connected to each other by the reset signal line 51 and the read signal line 52. The reset signal line 51 is connected to the sensor scanning section 14, and the reset signal Vreset is supplied from the sensor scanning section 14 to the reset signal line 51. The read signal line 52 is connected to the sensor scanning section 14, and the read signal Vread is supplied from the sensor scanning section 14 to the read signal line 52. Each sensor cell 50, and the other sensor cell 50 which belong to the same column of the display section 30 with the sensor are connected to each other by the sensor signal line 53. The sensor signal line 53 is connected to the photo-reception signal receiver 60, and the sensor signal Vsens output from each sensor cell 50 is supplied to the photo-reception signal receiver 60 through the sensor signal line 53.

As illustrated in FIG. 4, the sensor cell 50 includes the photodiode 54, the capacitor 55, and the transistors 56 to 58. In the photodiode 54, its cathode is connected to a power source VDD, and its anode is connected to one end of the capacitor 55. The capacitor 55 is arranged between the anode of the photodiode 54 and a ground (GND). The transistors 56 to 58 may be composed of MOS TFTs or the like, and in this example, the transistors 56 to 58 are composed of n-channel MOS TFT. In the transistor 56, its drain is connected to the anode of the photodiode 54, its gate is connected to the reset signal line 51, and its source is connected to the ground (GND). In the transistor 57, its source is connected to the power source VDD, its gate is connected to the anode of the photodiode 54, and its drain is connected to the source of the transistor 58. In the transistor 58, its source is connected to the drain of the transistor 57, its gate is connected to the read signal line 52, and its drain is connected to the sensor signal line 53. With this structure, first, when the transistor 56 is turned on by the reset signal Vreset of the reset signal line 51, the capacitor 55 is discharged. Next, the photodiode 54 receives the light with the light amount corresponding to the existence of the external proximity object, generates a current from the cathode to the anode in accordance with that light amount, and charges the capacitor 55 with this current for an arbitrarily period. When the transistor 58 is turned on by the read signal Vread of the read signal line 52, the voltage corresponding to the sensor capacitance voltage Vcap of the charged capacitor 55 is output as the sensor signal Vsens to the sensor signal line 53 by the source follower operation of the transistor 57.

The photo-reception signal receiver 60 generates and outputs the photo-reception signal Vrec based on the sensor signal Vsens supplied from the display section 30 with the sensor. As illustrated in FIG. 2, the photo-reception signal receiver 60 includes a constant current source 61, an amplifier 62, and a transistor 63. The constant current source 61 is arranged between the sensor signal line 53 and the power source VSS, and allows a predetermined current to flow from the sensor signal line 53 to the power source VSS. When the read signal Vread is supplied to the display section 30 with the sensor, and the transistor 58 of the sensor cell 50 turns on, the constant current source 61 functions as a bias current source so that the transistor 57 operates as a source follower. In the amplifier 62, an input is connected to the sensor signal line 53, and an output is connected to the photo-reception signal holding section 16. The amplifier 62 is a circuit amplifying the supplied sensor signal Vsens to generate the photo-reception signal Vrec, and supplying the photo-reception signal Vrec to the photo-reception signal holding section 16. The transistor 63 is composed of a TFT or the like, and is composed of the n-channel MOS TFT in this example. In the transistor 63, its drain is connected to the sensor signal line 53, its gate is connected to the sensor scanning section 14, and its source is connected to the power source VSS. The transistor 63 is controlled to turn on/off in response to the sensor signal line reset signal Vsr output from the sensor scanning section 14, and has a function to set (reset) the sensor signal line 53 to have the potential of the power source VSS.

The photo-reception signal holding section 16 constitutes the photo-reception signal for each screen (each display of one field) based on the photo-reception signal Vrec supplied from the photo-reception signal receiver 60, in response to the photo-reception timing controlling signal supplied from the sensor scanning section 14. For example, the photo-reception signal constituted in this manner is stored and held in the field memory composed of a SRAM or the like. The process such as the position detection is performed based on data of the photo-reception signal stored in the photo-reception signal holding section 16. In addition, the photo-reception signal holding section 16 may be composed of memory elements other than the memories, and, for example, the photo-reception signal may be held as analogue data (electric charge) in the capacitor.

Here, the display cell 40 and the sensor cell 50 correspond to a specific example of "display pixel" and "image pickup element" in the present application. The photodiode 54 corresponds to a specific example of "photo-detector" in the present application. The switch group 25 corresponds to a specific example of "a plurality of first switching elements" in the present application.

Operations and Actions

Next, operations and actions of the display device 10 with the touch sensor of the first embodiment will be described.

Outline of Overall Operation

Based on the supplied image signal Vimg, the display controlling section 11 supplies the image signal of one display horizontal line to the display signal driver 15, and supplies the timing control signal to the common signal driver 12, the display scanning section 13, and the sensor scanning section 14, thereby controlling the common signal driver 12, the display scanning section 13, the sensor scanning section 14, and the display signal driver 15 to operate in conjugation with each other. The common signal driver 12 generates the common signal Vcom, and supplies the common signal Vcom to the display section 30 with the sensor. The display scanning section 13 generates the display scanning signal Vscan, and supplies the display scanning signal Vscan to the display section 30 with the sensor. The display signal driver 15 generates the display signal Vsig in which the pixel signals Vpix are multiplexed, and the switch control signals Vsel1 to Vsel6 corresponding to the display signal Vsig, and supplies the display signal Vsig and the switch control signals Vsel1 to Vsel6 to the selection switch section 20. The selection switch section 20 generates the pixel signal Vpix based on the display signal Vsig and the switch control signals Vsel1 to Vsel6, and supplies the pixel signal Vpix to the display section 30 with the sensor through the pixel signal line 43. The display section 30 with the sensor line-sequentially scans the display horizontal lines one by one based on the supplied pixel signal Vpix, the supplied display scanning signal Vscan, and the supplied common signal Vcom, and thereby displaying the image corresponding to the image signal Vimg. Further, in the horizontal blanking period prior to this display period, the display signal driver 15 generates the predetermined precharge voltage Vpcg, and supplies the precharge voltage Vpcg to the section switch section 20. The selection switch section 20 previously supplies the precharge voltage Vpcg to all the pixel signal lines 43, and precharges the pixel signal lines 43.

In the different horizontal blanking period, the sensor scanning section 14 generates the reset signal Vreset and the read signal Vread, and supplies the reset signal Vreset and the read signal Vread to the display section 30 with the sensor. The photodiode 54 of the display section 30 with the sensor generates the current by receiving the light with the light amount corresponding to the existence of the external proximity object, and charges the capacitor 55 in the period (accumulated time Tstr) from the discharge by the reset signal Vreset until the reading by the read signal Vread. In the display section 30 with the sensor, the sensor horizontal lines are line-sequentially scanned one by one with the supplied reset signal Vreset and the supplied read signal Vread, and the voltage corresponding to the sensor capacitance voltage Vcap of the capacitor 55 is supplied as the sensor signal Vsens to the photo-reception signal receiver 60. The photo-reception signal receiver 60 amplifies the sensor signal Vsens, and supplies the sensor signal Vsens as the photo-reception signal Vrec to the photo-reception signal holding section 16. The photo-reception signal holding section 16 sequentially stores the photo-reception signal Vrec by each scanning in the field memory, and therefore constitutes the photo-reception signal data of one screen. Therefore, the place or the like of the external proximity object in the sensor detection face is detected.

Detailed Operations

Detailed operations in an ideal case will be described with reference to FIGS. 5 and 6.

Figure 5:
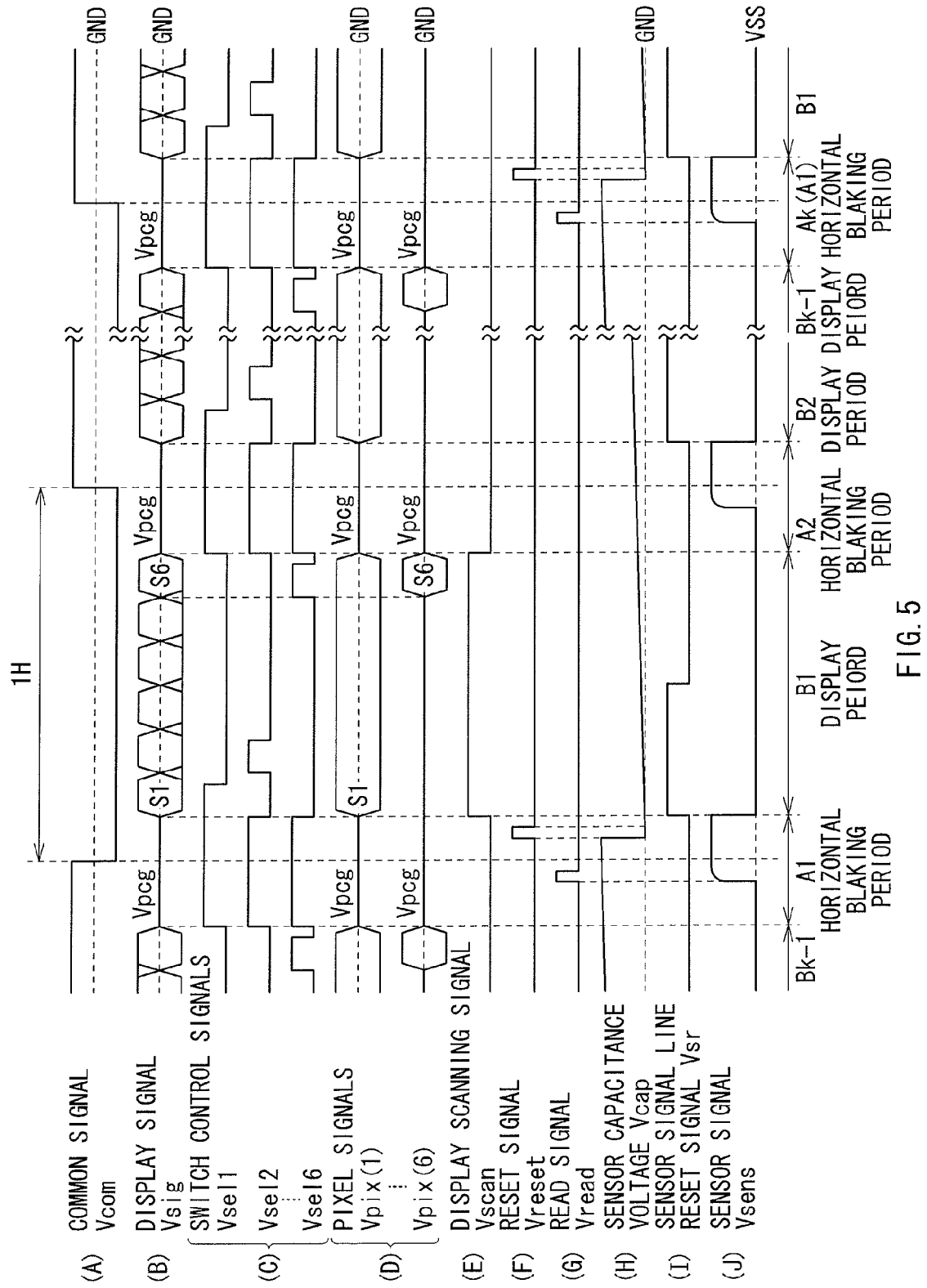
FIG. 5 is a timing waveform diagram illustrating an operational example of the display device with the touch sensor illustrated in FIG. 1.

FIG. 5 illustrates a timing diagram of the display operation and the touch sensor operation of the display device 10 with the touch sensor. In FIG. 5, Part A indicates the waveform of the common signal Vcom, Part B indicates the waveform of the display signal Vsig, Part C indicates the waveforms of the switch control signals Vsel1 to Vsel6, Part D indicates the waveforms of the pixel signals Vpix, Part E indicates the waveform of the display scanning signal Vscan, Part F indicates the waveform of the reset signal Vreset, Part G indicates the waveform of the read signal Vread, Part H indicates the waveform of the sensor capacitance voltage Vcap, Part I indicates the waveform of the sensor signal line reset signal Vsr, and Part J indicates the waveform of the sensor signal Vsens. Here, each switch of the selection switch section 20 turns on when the switch control signals Vsel1 to Vsel6 are at the high level, respectively. In this figure, in the signals of the plurality of signal lines located corresponding to the matrix of the display section 30 with the sensor, only the signal related to a certain focused display horizontal line, and the signal related to a certain focused sensor horizontal line are indicated. In other words, the waveform of the display scanning signal Vscan (Part E of FIG. 5) indicates the waveform of the signal supplied to the focused display horizontal line, and each of the waveform of the reset signal Vreset (Part F of FIG. 5) and the waveform of the read signal Vread (Part G of FIG. 5) indicates the waveform of the signal supplied to the focused sensor horizontal line. The waveform of the sensor capacitance voltage Vcap (Part H of FIG. 5) indicates the voltage waveform of a certain focused capacitor 55 in the sensor cells 50 constituting the focused sensor horizontal line.

Figure 6:
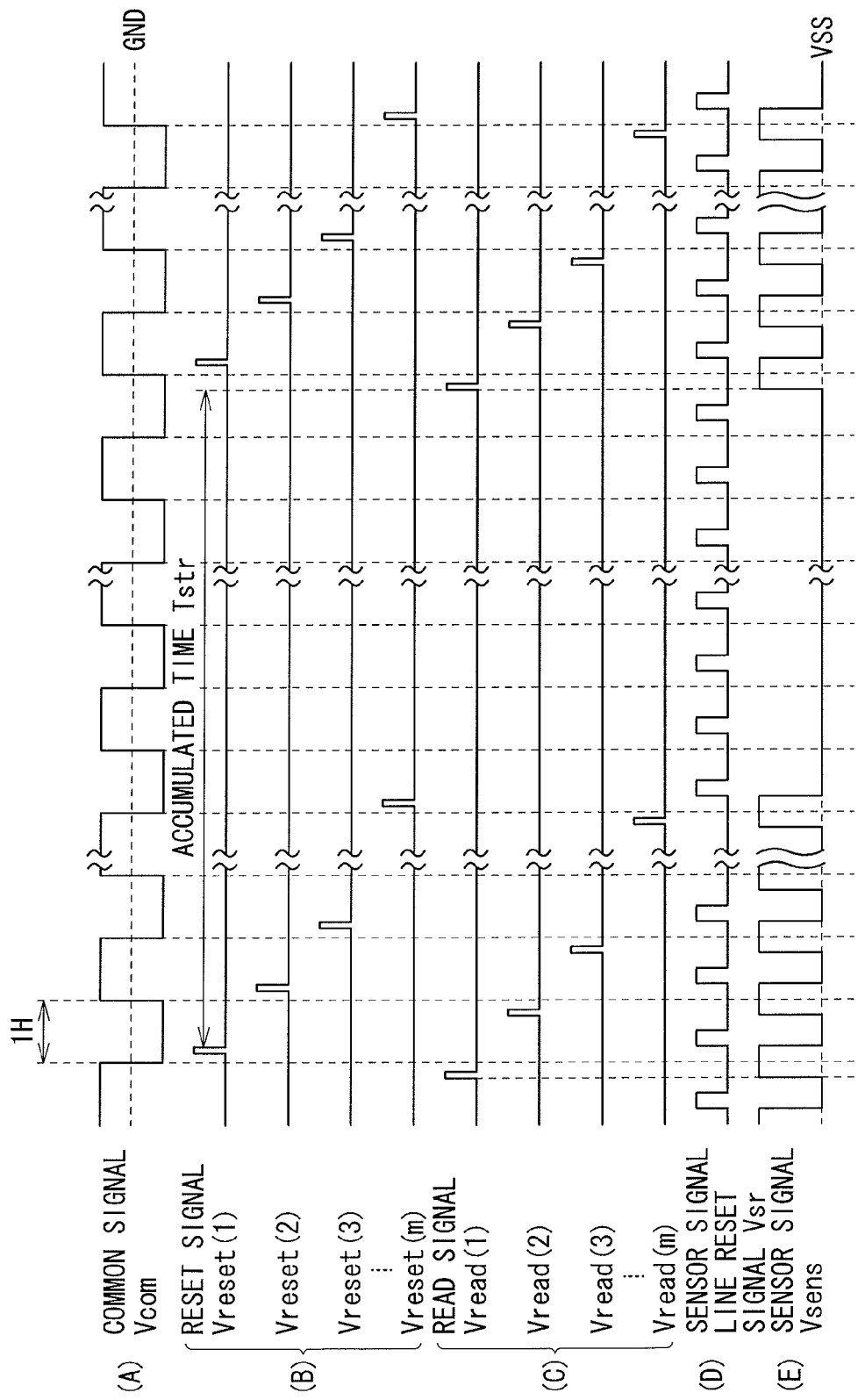
FIG. 6 is a timing waveform diagram illustrating an example of sequential scanning of a touch sensor operation in the display device with the touch sensor illustrated in FIG. 1.

FIG. 6 illustrates the timing diagram of the touch sensor operation of the display device 10 with the touch sensor. In FIG. 6, Part A indicates the waveform of the common signal Vcom, Part B indicates the waveform of the reset signal Vreset, Part C indicates the waveform of the read signal Vread, Part D indicates the waveform of the sensor signal line reset signal Vsr, and Part E indicates the waveform of the sensor signal Vsens.

As illustrated in FIG. 5, the display device 10 with the touch sensor performs the display operation and the touch sensor operation by a series of operations of a horizontal blanking period An and a display period Bn (n is a natural number of k or less). Here, "k" corresponds to the time (accumulated time Tstr) for charging the capacitor 55. Specifically, first, in the horizontal blanking period A1, the display device 10 with the touch sensor precharges the pixel signal lines 43, resets the sensor cells 50 constituting the certain sensor horizontal line, and starts charging the capacitors 55 after discharging the capacitors 55. Next, in the display period B1, the display is performed on the display cells 40 of the certain display horizontal line. Thereafter, as illustrated in FIG. 6, the same operation as the horizontal blanking period A1 is performed on the other sensor horizontal line in the horizontal blanking period An, and, in the display period Bn, the same operation as the display period B1 is performed on the other display horizontal line. The horizontal blanking period An and the display period Bn are alternately repeated. In the horizontal blanking period Ak (A1), the pixel signal lines 43 are precharged again, and the voltage (sensor capacitance voltage Vcap) of the capacitors 55 in the sensor cells 50 which has started charging in the horizontal blanking period A1 is read. Further, in the horizontal blanking period Ak (A1), these sensor cells 50 are reset, and the display device 10 with the touch sensor starts charging the capacitors 55 again after discharging the capacitors 55. By repeating the series of operations, the display device 10 with the touch sensor continuously performs the display operation and the touch sensor operation.

Horizontal Blanking Period A1

First, as illustrated in FIG. 5, the display device 10 with the touch sensor precharges the pixel signal lines 43, resets the sensor cells 50 constituting the certain sensor horizontal line, and starts charging the capacitors 55. Specifically, first, the display scanning section 13 reduces, from the high level to the low level, the level of the display scanning signal Vscan of the display horizontal line displayed in the last display period Bk-1 (not illustrated in the figure), and turns off the transistors 44 of all the display cells 40, thereby separating the pixel signal lines 43 from all the liquid crystal element 45. The display signal driver 15 outputs the predetermined precharge voltage Vpcg (here, 0V) as the display signal Vsig (Part B of FIG. 5), and the selection switch section 20 increases, from the low level to the high level, the level of all the switch control signals Vsel1 to Vsel6 (Part C of FIG. 5). Therefore, in the selection switch section 20, all the switches turn on, the precharge voltage Vpcg is supplied as the pixel signal Vpix to all the pixel signal lines 43, and all the pixel signal lines 43 are precharged (Part D of FIG. 5). Next, the common signal driver 12 inverts the common signal Vcom (Part A of FIG. 5), and prepares for the next display period B1. Also at this time, the predetermined voltage Vpcg is continuously supplied to all the pixel signal lines 43 (Part D of FIG. 5). In this manner, by previously charging the pixel signal lines 43 before the display period, the display on the display horizontal line is rapidly performed in the display period subsequent to the horizontal blanking period. Thereafter, the sensor scanning section 14 outputs the reset pulse as the reset signal Vreset to the certain sensor horizontal line (Part F of FIG. 5). At this time, the transistor 56 of the sensor cell 50 turns on only during the time corresponding to a reset pulse width, the capacitor 55 is discharged, and the sensor capacitance voltage Vcap becomes 0V (Part H of FIG. 5). The photodiode 54 of the sensor cell 50 receives the light with the light amount corresponding to the existence of the external proximity object, and continues to generate the current without stopping. Therefore, when the transistor 56 turns off again after the capacitor 55 is discharged, the charging to the capacitor 55 is started with that current, and the sensor capacitance voltage Vcap starts to increase (Part H of FIG. 5). Thereafter, the sensor scanning section 14 increases, from the low level to the high level, the level of the sensor signal line reset signal Vsr (Part I of FIG. 5). Thus, the transistor 63 of the photo-reception signal receiver 60 turns on, and the power source VSS is connected to the sensor signal line 53, thereby allowing the sensor signal Vsens of the sensor signal line 53 to be initialized (Part J of FIG. 5).

Display Period B1

Next, the display device 10 with the touch sensor performs display on the display cells 40 constituting the certain display horizontal line. Specifically, first, the display scanning section 13 increases, from the low level to the high level, the level of the display scanning signal Vscan in the certain display horizontal line (Part E of FIG. 5). Therefore, the transistor 44 of the display cell 40 to which the display scanning signal Vscan is supplied turns on, and the pixel signal line 43 and the liquid crystal element 45 are connected. At the same time, the display signal driver 15 outputs the display signal Vsig to which the pixel signals Vpix are time-divisionally multiplexed (Part B of FIG. 5), and outputs the corresponding switch control signals Vsel1 to Vsel6 (Part C of FIG. 5). In response to the switch control signals Vsel1 to Vsel6, the selection switch section 20 time-divisionally sequentially turns on the six switches of each switch group 25, thereby demultiplexing the pixel signals Vpix from the multiplexed display signal Vsig. For example, a signal 51 of the display signal Vsig in Part B of FIG. 5 is demultiplexed from the display signal Vsig by using the switch control signal Vsel1, and supplied as the pixel signal Vpix (Vpix (1)) to the corresponding pixel signal line 43 (Part D of FIG. 5). In the same manner, a signal S6 of the display signal Vsig in Part B of FIG. 5 is demultiplexed from the display signal Vsig by using the switch control signal Vsel6, and supplied as the pixel signal Vpix (Vpix (6)) to the corresponding pixel signal line 43 (Part D of FIG. 5). Therefore, each pixel signal Vpix is supplied to all the display cells 40 constituting that display horizontal line, and the display of the display horizontal line is performed. Until the display period B1 is completed, the sensor scanning section 14 reduces, from the high level to the low level, the level of the sensor signal line reset signal Vsr (Part I of FIG. 5). Therefore, the transistor 63 of the photo-reception signal receiver 60 turns off, and the preparation for reading the sensor signal Vsens which will be performed later is completed.

Horizontal Blanking Period An and Display Period Bn

Next, as illustrated in FIG. 5, in the horizontal blanking period A2, the display device 10 with the touch sensor precharges the pixel signal lines 43, resets the sensor cells 50 constituting the sensor horizontal line different from that of the horizontal blanking period A1, and start charging the capacitors 55. Specifically, first, the display scanning section 13 reduces, from the high level to the low level, the level of the display scanning signal Vscan (Part E of FIG. 5). Therefore, the transistors 44 of the display cells 40 turn off, and the pixel signal lines 43 are separated away from all the liquid crystal elements 45. The display signal driver 15 outputs the predetermined precharge voltage Vpcg (here, 0V) as the display signal Vsig (Part B of FIG. 5), and the selection switch section 20 increases, from the low level to the high level, the level of all the switch control signals Vsel1 to Vsel6 (Part C of FIG. 5). Therefore, in the selection switch section 20, all the switches turn on, the precharge voltage Vpcg is supplied as the pixel signal Vpix to all the pixel signal lines 43 (Part D of FIG. 5), and all the pixel signal lines 43 are precharged in the same manner as the horizontal blanking period A1. Next, the common signal driver 12 inverts the common signal Vcom (Part A of FIG. 5), and prepares for the next display period B2. Thereafter, the display device 10 with the touch sensor supplies the reset signal Vreset to the reset signal line 51 corresponding to the sensor horizontal line different from that of the horizontal blanking period A1 as illustrated in FIG. 6 (Part B of FIG. 6), resets the sensor cells 50, and starts charging the capacitors 55. That operation is completely the same as the horizontal blanking period A1 except that the sensor horizontal line is different.

Next, in the display period B2, the display device 10 with the touch sensor performs the display on the display cells 40 constituting the display horizontal line different from that of the display period B1. The operation is completely the same as the display period B1 except that the display horizontal line is different.

Thereafter, the display device 10 with the touch sensor alternately repeats the horizontal blanking period An and the display period Bn, while sequentially selecting the sensor horizontal line and the display horizontal line. In other words, in the horizontal blanking period An, the pixel signal line 43 is precharged, and, as illustrated in FIG. 6, the reset signal Vreset is time-divisionally sequentially supplied to the reset signal line 51 (Part B of FIG. 6), and therefore the sensor cells 50 constituting each sensor horizontal line are reset. As illustrated in FIG. 5, in the display period Bn, the display scanning signal Vscan is time-divisionally sequentially supplied to the display scanning signal line 41, and therefore the display is performed on the display cells 40 constituting each display horizontal line.

Horizontal Blanking Period Ak (A1)

Finally, as illustrated in FIG. 5, the display device 10 with the touch sensor precharges the pixel signal lines 43 again, and reads the sensor capacitance voltage Vcap of the capacitors 55 constituting the sensor horizontal line which has started charging in the horizontal blanking period A1. Specifically, first, the display scanning section 13 reduces, from the high level to the low level, the level of the display scanning signal Vscan of the display horizontal line displayed in the last display period Bk-1 (not illustrated in the figure), and the transistors 44 of all the display cells 40 turn off. Therefore, the pixel signal lines 43 are separated away from all the liquid crystal elements 45. The display signal driver 15 outputs the predetermined precharge voltage Vpcg (here, 0V) as the display signal Vsig (Part B of FIG. 5), and increases, from the low level to the high level, the level of all the switch control signals Vsel1 to Vsel6 (Part C of FIG. 5). Therefore, in the selection switch section 20, all the switches turn on, the precharge voltage Vpcg is supplied as the pixel signal Vpix to all the pixel signal lines 43 (Part D of FIG. 5), and all the pixel signal lines 43 are precharged in the same manner as the horizontal blanking period A1. Thereafter, the sensor scanning section 14 outputs the read pulse as the read signal Vread (part G of FIG. 5). At this time, the transistor 58 of the sensor cell 50 turns on only during the time corresponding to the read pulse width. The transistor 57 performs the source follower operation by using, as the bias current, the current of the constant current source 61 of the photo-reception signal receiver 60, and the voltage corresponding to the sensor capacitance voltage Vcap of the capacitor 55 is output as the sensor signal Vsens to the sensor signal line 53 (Part J of FIG. 5). After the capacitor 55 is discharged in the horizontal blanking period A1, the capacitor 55 is continuously charged corresponding to the existence of the external proximity object during the accumulated period Tstr (Part H of FIG. 5). Therefore, the sensor capacitance voltage Vcap has the voltage level corresponding to the existence of the external proximity object, and thus the sensor signal Vsens also corresponds to the existence of the external proximity object. After the sensor signal Vsens is amplified by the amplifier 62 of the photo-reception signal receiver 60, the sensor signal Vsens is supplied as the photo-reception signal Vrec to the photo-reception signal holding section 16, and stored in the field memory.

In addition, in this example, the horizontal blanking period Ak also functions as the horizontal blanking period A1 in the next sensor operation of this sensor horizontal line. In other words, in the horizontal blanking period Ak (A1), as described above, the display device 10 with the touch sensor reads the sensor capacitance voltage Vcap of the capacitors 55 constituting the sensor horizontal line, resets the sensor cells 50, and starts charging the capacitors 55 after discharging the capacitors 55. In this manner, by repeating the series of operations of the periods A1 to Ak (A1), the display device 10 with the touch sensor continuously performs the display operation and the touch sensor operation.

Case Where Crosstalk Noise is Considered

Next, the operation in the case where the crosstalk noise is considered will be described. As described above, the display device 10 with the touch sensor charges the capacitor 55 with the current supplied from the photodiode 54, and detects the existence of the external proximity object with the charged voltage. Therefore, even in the case where the crosstalk noise is mixed from adjacent wiring into the capacitor 55, it is necessary for the display device 10 with the touch sensor to operate while being hardly influenced by the crosstalk noise.

Figure 7:
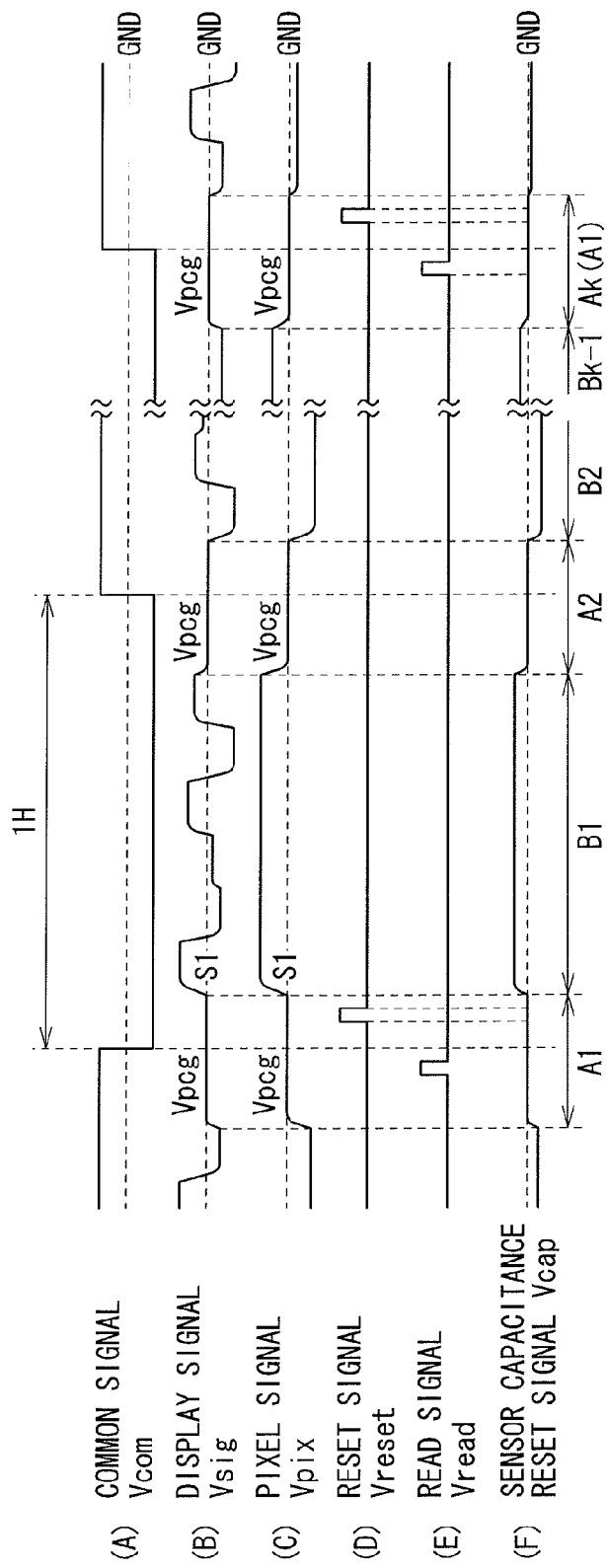
FIG. 7 is a timing waveform diagram illustrating an operational example in the state where a crosstalk noise is present in the display device with the touch sensor illustrated in FIG. 1.

FIG. 7 illustrates the timing diagram of the touch sensor operation of the display device 10 with the touch sensor, and illustrates an example of the case where the crosstalk noise is considered. Here, for the sake of simplicity, the description will be made on the assumption that the photodiode 54 generates no currents, and other conditions are completely the same as FIG. 5. In FIG. 7, Part A indicates the waveform of the common signal Vcom, Part B indicates the waveform of the display signal Vsig, Part C indicates the waveform of the pixel signal Vpix, Part D indicates the waveform of the reset signal Vreset, Part E indicates the waveform of the read signal Vread, and Part F indicates the sensor capacitance voltage Vcap.

In the horizontal blanking period A1, when the reset pulse is supplied as the reset signal Vreset, the transistor 56 of the sensor cell 50 turns on only during the time corresponding to the reset pulse width, the capacitor 55 is discharged, and the sensor capacitance voltage Vcap becomes 0V (Part F of FIG. 7). Thereafter, when the transistor 56 turns off again, one end of the capacitor 55 is in a floating state until the next reset signal Vreset is supplied. At this time, in the sensor capacitance voltage Vcap, for example, there is a risk that the signal of the surrounding wiring appears as the crosstalk noise through the parasitic capacitance between the surrounding wiring. For example, as illustrated in FIG. 7, the pixel signal Vpix (Part C of FIG. 7) of the pixel signal line 43 appears as the noise in the sensor capacitance voltage Vcap.

Even in this case, the display device 10 with the touch sensor is hardly influenced by the noise, and the deterioration of the touch sensor accuracy may be minimized. The reason will be described in the following. That is, in the horizontal blanking period A1, after the capacitor 55 is discharged and the sensor capacitance voltage Vcap becomes 0V, although the signal corresponding to the pixel signal Vpix appears as the crosstalk noise in the sensor capacitance voltage Vcap, the voltage level in the horizontal blanking period Ak is the same as the voltage level in the horizontal blanking period A1. In other words, the sensor capacitance voltage Vcap is at the same voltage level when the sensor cell 50 to which the reset signal Vreset is supplied is reset, and when the sensor capacitance voltage Vcap to which the read signal Vread is supplied is read, and there is no influence received from the noise which is caused by the pixel signal Vpix. This suggests that, even in the case where the current is generated by receiving the light corresponding to the existence of the external proximity object, and the capacitor 55 is charged with the current, the photodiode 54 is not influenced by the noise caused by the pixel signal Vpix in the same manner.

As described above, this results from the situation that the predetermined precharge voltage Vpcg is supplied to the pixel signal line 43 at any time in the horizontal blanking periods A1 and Ak. Therefore, the pixel signal Vpix has the same voltage level in the horizontal blanking periods A1 and Ak (Part C of FIG. 7). Therefore, the crosstalk noise appearing in the sensor capacitance voltage Vcap, and caused by the pixel signal Vpix also has the same voltage level in the horizontal blanking periods A1 and Ak (Part F of FIG. 7). As a result, in the change amount of the sensor capacitance voltage Vcap in the discharging operation (A1) and the reading operation (Ak), the influence of the crosstalk noise is canceled, and it may be possible to minimize the influence of the crosstalk noise on the touch sensor accuracy.

Comparative Example

Next, a display device with a touch sensor according to a comparative example will be described. In this comparative example, unlike the first embodiment, precharging is performed only in a part of the horizontal blanking period An. In other words, although the display device 10 with the touch sensor is configured by using the display signal driver 15 which outputs the predetermined precharge voltage Vpcg as the display signal Vsig at any time in the horizontal blanking period An in the first embodiment (FIG. 1), in substitution for this, a display device 10R with a touch sensor is configured by using a display signal driver 15R which outputs the predetermined precharge voltage Vpcg only in the part of the horizontal blanking period An in this comparative example. Other structures are the same as those of the first embodiment (FIG. 1). Hereinafter, the detailed operation will be described with reference to FIGS. 8 and 9.

Figure 8:
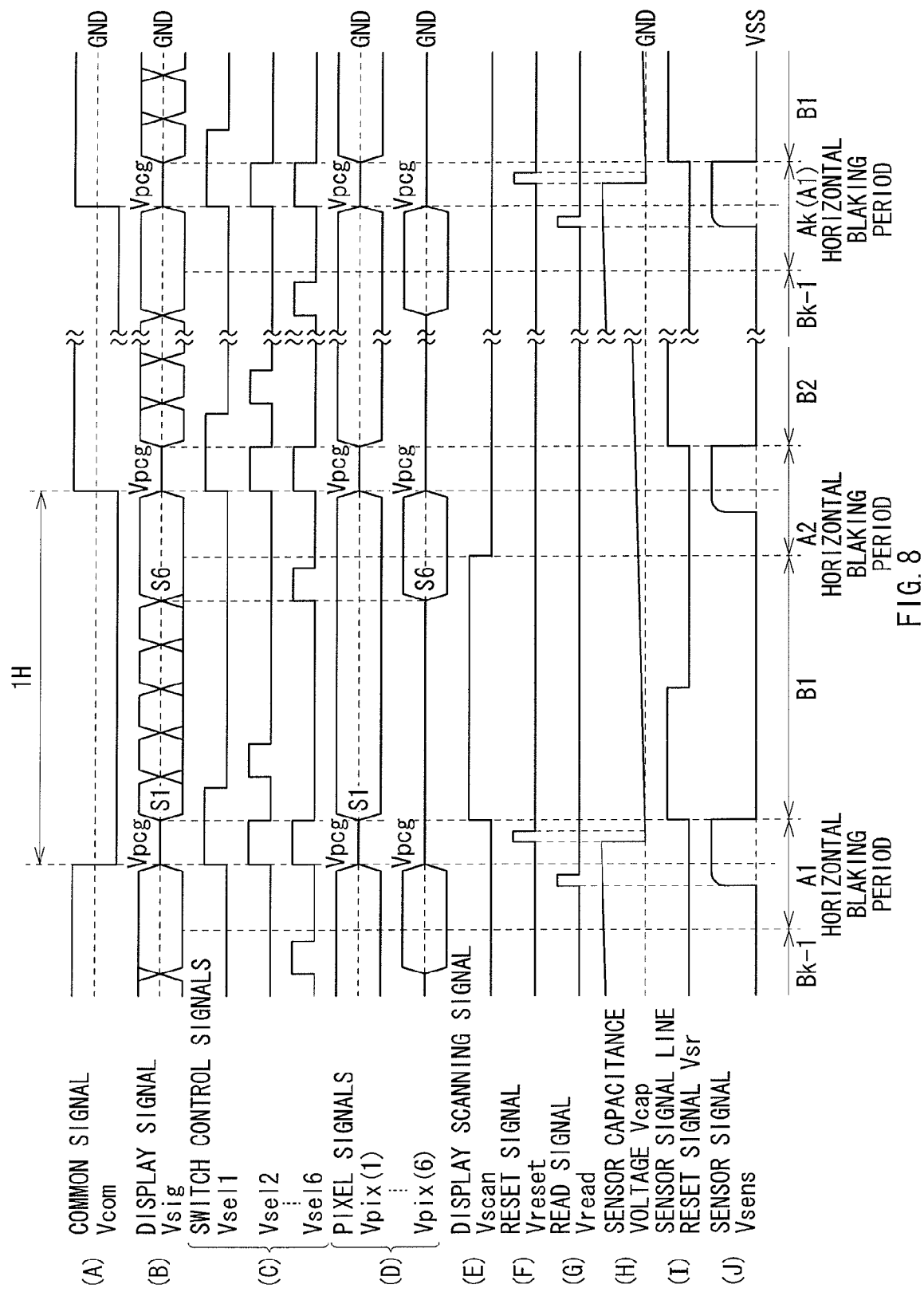
FIG. 8 is a timing waveform diagram illustrating an operational example of a display device with a touch sensor according to a comparative example.

FIG. 8 illustrates the timing diagram of the display operation and the touch sensor operation of the display device 10R with the touch sensor according to the comparative example. In FIG. 8, Part A indicates the waveform of the common signal Vcom, Part B indicates the waveform of the display signal Vsig, Part C indicates the waveforms of the switch control signals Vsel1 to Vsel6, Part D indicates the waveforms of the pixel signals Vpix, Part E indicates the waveform of the display scanning signal Vscan, Part F indicates the waveform of the reset signal Vreset, Part G indicates the waveform of the read signal Vread, Part H indicates the waveform of the sensor capacitance voltage Vcap, Part I indicates the waveform of the sensor signal line reset signal Vsr, and Part J indicates the waveform of the sensor signal Vsens. In addition, same reference numerals as in the display device 10 with the touch sensor of the first embodiment will be used to indicate substantially identical components, and therefore the description is appropriately omitted.

The operation in the display period Bn in this comparative example is the same as the corresponding operation (periods B1, B2, . . . , Bk-1 in FIG. 5) in the display device 10 with the touch sensor of the first embodiment. Therefore, the operation in the horizontal blanking period Anr (n is a natural number of k or less) will be described below.

Horizontal Blanking Period A1r

First, the display device 10R with the touch sensor resets the sensor cells 50 constituting the certain sensor horizontal line, and starts charging the capacitors 55. Specifically, first, the display scanning section 13 reduces, from the high level to the low level, the level of the display scanning signal Vscan of the display horizontal line displayed in the last display period Bk-1 (not illustrated in the figure), and separates away the pixel signal lines 43 from all the liquid crystal element 45. The display signal driver 15R sets all the switch control signals Vsel1 to Vsel6 to the low level (Part C of FIG. 8). Therefore, in the selection switch section 20, all the switches turn off, and all the pixel signal lines 43 are in the floating state. At this time, the pixel signal Vpix operates to maintain the voltage level in the last display period. Next, the common signal driver 12 inverts the common signal Vcom (Part A of FIG. 8), and prepares for the next display period. The display signal driver 15R outputs the predetermined precharge voltage Vpcg (here, 0V) as the display signal Vsig (Part B of FIG. 8), and the selection switch section 20 increases, from the low level to the high level, the level of all the switch control signals Vsel1 to Vsel6 (Part C of FIG. 8). Therefore, in the selection switch section 20, all the switches turn on, the precharge voltage Vpcg is supplied as the pixel signal Vpix to all the pixel signal lines 43, and all the pixel signal lines 43 are precharged (Part D of FIG. 8). In this manner, by previously charging the pixel signal lines 43 before the display period, the display of the display horizontal line is rapidly performed in the display period subsequent to the horizontal blanking period. Thereafter, the sensor scanning section 14 outputs the reset pulse as the reset signal Vreset (Part F of FIG. 8), the capacitor 55 is discharged, and the sensor capacitance voltage Vcap becomes 0V (Part H of FIG. 8). Thereafter, when the transistor 56 turns off again, the sensor capacitance voltage Vcap starts increasing (Part H of FIG. 8). Next, the sensor scanning section 14 increases, from the low level to the high level, the level of the sensor signal line reset signal Vsr (Part I of FIG. 8), and the sensor signal Vsens of the sensor signal line 53 is initialized (Part J of FIG. 8).

Horizontal Blanking Period Anr

Next, in the horizontal blanking period A2r, the display device 10R with the touch sensor resets the sensor cells 50 constituting the sensor horizontal line different from that of the horizontal blanking period A1r, and starts charging the capacitors 55. The operation is the same as in the horizontal blanking period A1r except that the sensor horizontal line is different.

Thereafter, the display device 10R with the touch sensor alternately repeats the horizontal blanking period Anr and the display period Bn while sequentially selecting the sensor horizontal line and the display horizontal line Horizontal Blanking Period Akr (A1r)

Finally, the display device 10R with the touch sensor reads the sensor capacitance voltage Vcap of the capacitors 55 constituting the sensor horizontal line which has started charging in the horizontal blanking period A1r. Specifically, first, the display scanning section 13 reduces, from the high level to the low level, the level of the display scanning signal Vscan of the display horizontal line displayed in the last display period Bk-1 (not illustrated in the figure), and separates away the pixel signal lines 43 from all the liquid crystal element 45. At the same time, the display signal driver 15R sets all the switch control signals Vsel1 to Vsel6 to the low level (Part C of FIG. 8). Therefore, in the selection switch section 20, all the switches turn off, and all the pixel signal lines 43 are in the floating state. At this time, the pixel signal Vpix operates to maintain the voltage level in the display period Bk-1. The sensor scanning section 14 outputs the read pulse as the read signal Vread (part G of FIG. 8), and the voltage corresponding to the sensor capacitance voltage Vcap of the capacitor 55 is output as the sensor signal Vsens to the sensor signal line 53 (Part J of FIG. 8).

In this comparative example, in the horizontal blanking period An, the display device 10R with the touch sensor performs the precharging only after the common signal Vcom is inverted. In other words, in the first embodiment, at any time in the horizontal blanking period An, the display signal driver 15 outputs the predetermined precharge voltage Vpcg as the display signal Vsig (Part B of FIG. 5), and supplies the precharge voltage Vpcg to the pixel signal line 43 (Part D of FIG. 5). On the other hand, in this comparative example, in the horizontal blanking period Anr, the display signal driver 15R outputs the predetermined precharge voltage Vpcg as the display signal Vsig only after the common signal Vcom is inverted (Part B of FIG. 8), and supplies the precharge voltage Vpcg to the pixel signal line 43 (Part D of FIG. 8).

Figure 9:
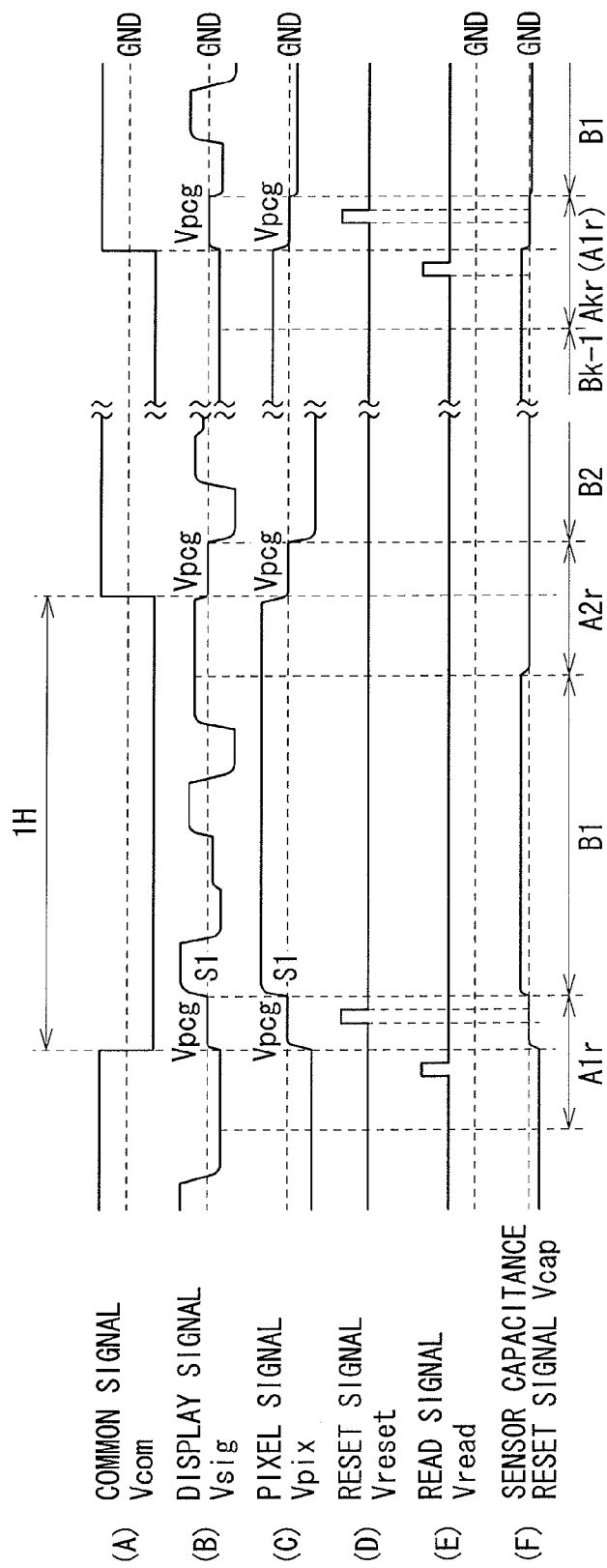
FIG. 9 is a timing waveform diagram illustrating an operational example in the state where the crosstalk noise is present in the display device with the touch sensor according to the comparative example.

FIG. 9 illustrates the timing diagram of the touch sensor operation of the display device 10R with the touch sensor according to the comparative example, and indicates an example of the case where the crosstalk noise is considered. Here, for the sake of simplicity, the description will be made on the assumption that the photodiode 54 generates no currents, and other conditions are the same as FIG. 7. In FIG. 9, Part A indicates the waveform of the common signal Vcom, Part B indicates the waveform of the display signal Vsig, Part C indicates the waveform of the pixel signal Vpix, Part D indicates the waveform of the reset signal Vreset, Part E indicates the wafeform of the read signal Vread, and Part F indicates the sensor capacitance voltage Vcap.

In the horizontal blanking period A1r, when the reset pulse is supplied as the reset signal Vreset, the transistor 56 of the sensor cell 50 turns on only during the time corresponding to the reset pulse width, the capacitor 55 is discharged, and the sensor capacitance voltage Vcap becomes 0V (Part F of FIG. 9). Thereafter, when the transistor 56 turns off again, one end of the capacitor 55 is in the floating state until the next reset signal Vreset is supplied. At this time, in the sensor capacitance voltage Vcap, for example, as illustrated in FIG. 9, there is a risk that the pixel signal Vpix (Part C of FIG. 9) of the pixel signal line 43 arranged in the vicinity of the capacitor 55 may appear as the crosstalk noise.

At this time, the display device 10R with the touch sensor is influenced by the crosstalk noise, and the touch sensor accuracy is deteriorated. In other words, when the reset signal Vreset is supplied in the horizontal blanking period A1r, and when the read signal Vread is supplied in the horizontal blanking period Akr, the sensor capacitative voltage Vcap is differed by being influenced from the noise caused by the pixel signal Vpix. Therefore, in the case where the photodiode 54 receives the light corresponding to the existence of the external proximity object, and generates the current, and the capacitor is charged, in the sensor capacitative voltage Vcap in the read signal Vread, the voltage by the crosstalk noise is superimposed on the voltage by this charging, and the touch sensor accuracy is deteriorated.

As described above, this results from the situation that, in the horizontal blanking period An, the display device 10R with the touch sensor according to the first embodiment performs the precharging only after the common signal Vcom is inverted. Therefore, the pixel signal Vpix has the different voltage levels (Part C of FIG. 9) when the reset signal Vreset is supplied in the horizontal blanking period A1 (before the common signal Vcom is inverted), and when the read signal Vread is supplied in the horizontal blanking period Ak (after the common signal Vcom is inverted). Therefore, also in the sensor capacitance voltage Vcap in which the pixel signal Vpix appears as the crosstalk noise through the parasitic capacity, the voltage level is differed (Part F of FIG. 9).

Meanwhile, in the first embodiment, as illustrated in FIGS. 5 and 7, since the display signal driver 15 performs the precharging at any time in the horizontal blanking periods A1 and Ak, the deterioration of the touch sensor accuracy may be minimized even when the crosstalk noise from the wiring in the vicinity such as the pixel signal line 43 is received.

Effects

As described above, in the first embodiment, in the horizontal blanking period, since the same precharge voltage Vpcg is supplied to the pixel signal line 43 when the sensor cell 50 is reset, and when the sensor capacitance voltage Vcap is read, the influence caused by the crosstalk noise is canceled, and it may be possible to minimize the deterioration of the touch sensor accuracy, while the device size and the power consumption are suppressed from increasing.

In the first embodiment, in the horizontal blanking period, since the predetermined precharge voltage Vpcg supplied to the pixel signal line 43 is generated in the display signal driver 15, and the precharge voltage Vpcg is supplied to all the pixel signal lines 43 through the selection switch section 20, the circuit structure may be simpler without newly providing a power source for the precharge voltage Vcg, and a circuit for supplying the precharge voltage Vcg.

(Modification 1-1)

Figure 10:
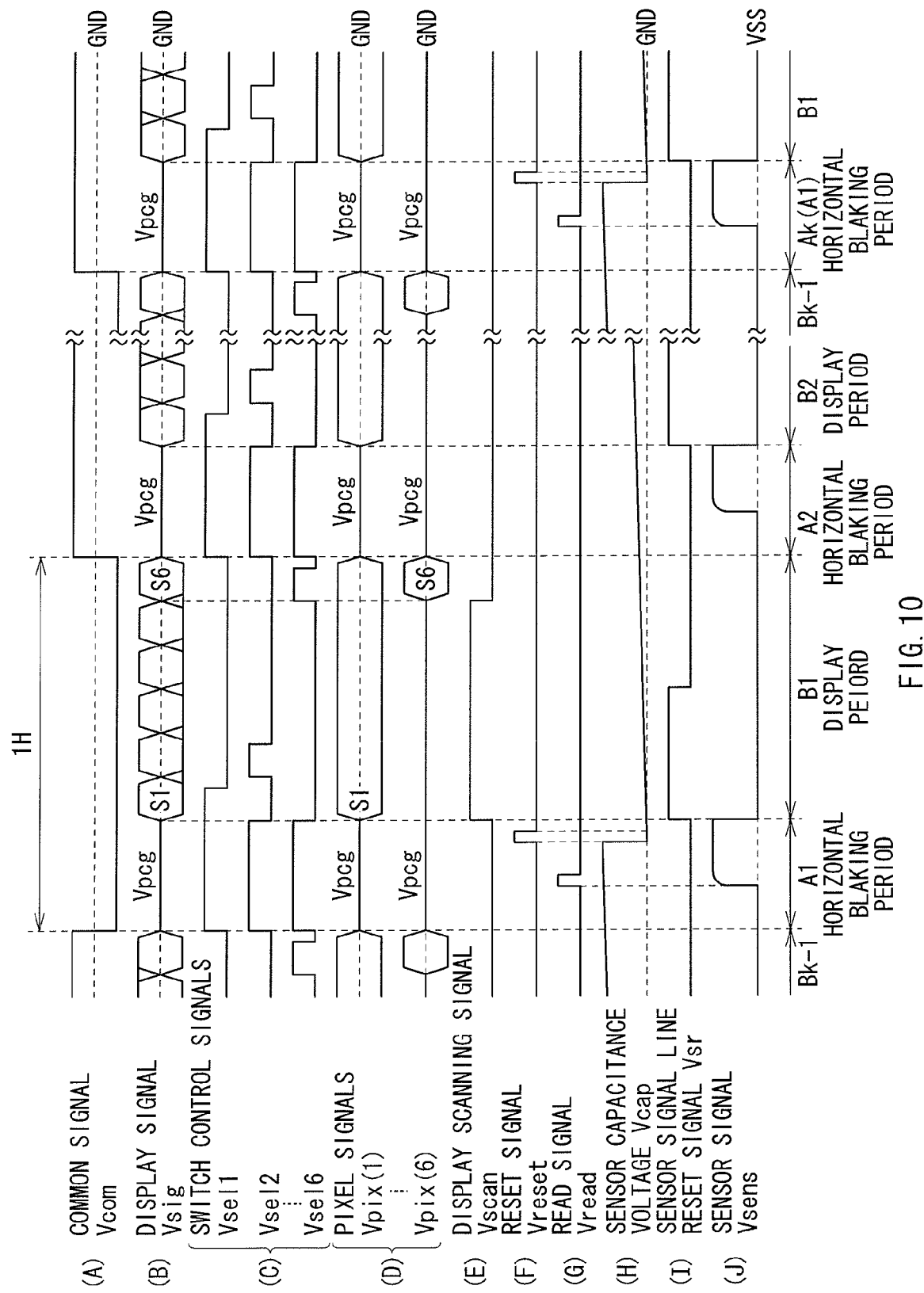
FIG. 10 is a timing waveform diagram illustrating an operational example of the display device with the touch sensor according to a modification of the first embodiment.

In the first embodiment, although the common signal Vcom is inverted in the vicinity of the middle in the horizontal blanking period An, it is not limited to this. Alternatively, for example, as illustrated in FIG. 10, the common signal Vcom may be inverted simultaneously with the start of the horizontal blanking period An. Even in this case, the display device with the touch sensor may minimize the deterioration of the touch sensor accuracy, while rapidly performing the display in the display period subsequent to the horizontal blanking period.

2. Second Embodiment

Next, the display device with the touch sensor according to a second embodiment will be described. In the second embodiment, a method of supplying the predetermined precharge voltage Vpcg is different from that in the first embodiment.

Specifically, although the display signal diver supplies the predetermined precharge voltage Vpcg in the first embodiment, the predetermined precharge voltage Vpcg is supplied in the different method in the second embodiment. In addition, like reference numerals as in the display device with the touch sensor of the first embodiment will be used to indicate substantially identical components, and therefore the description is appropriately omitted.

Structural Example

Figure 11:
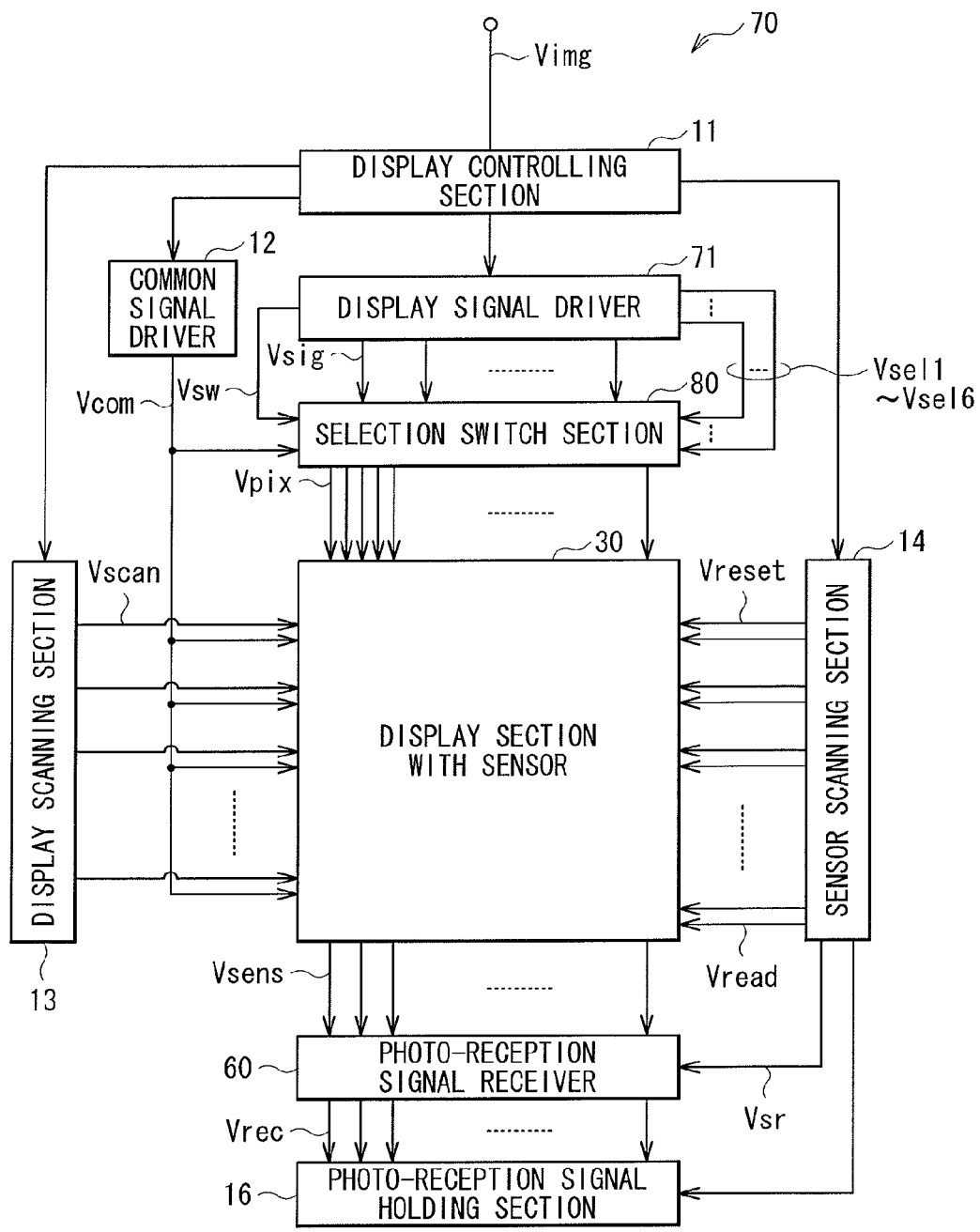
FIG. 11 is a block diagram illustrating a structural example of the display device with the touch sensor according to the second embodiment.
Figure 12:
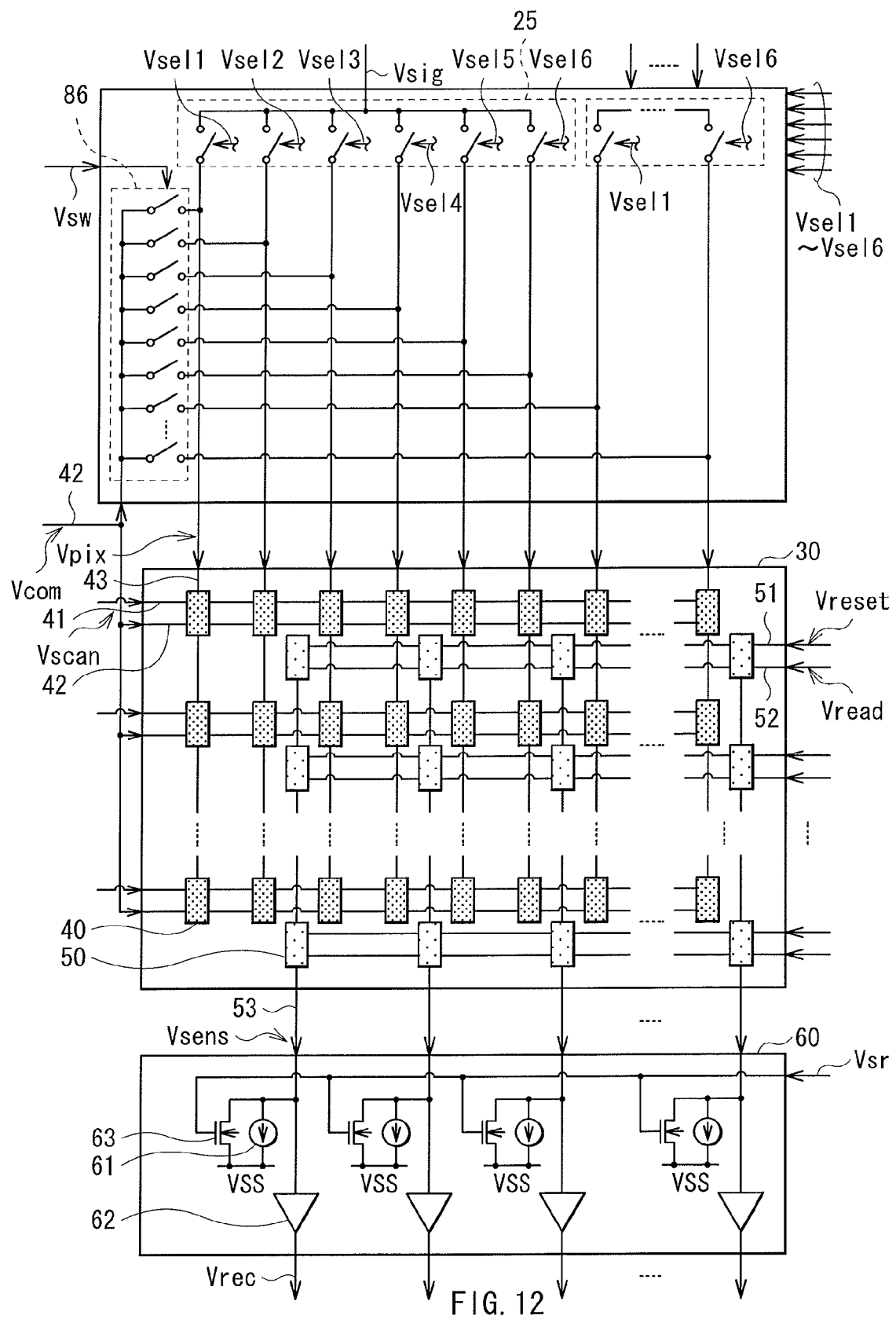
FIG. 12 is a block diagram illustrating a structural example of the main part of the display device with the touch sensor illustrated in FIG. 11.

FIG. 11 illustrates a structural example of a display device 70 with a touch sensor according to the second embodiment. FIG. 12 illustrates a detailed structure of a part of the display device with the touch sensor according to the second embodiment. The display device 70 with the touch sensor includes a display signal driver 71 and a selection switch section 80. Other structures are the same as those of the first embodiment (FIG. 1).

Based on the image signal of one display horizontal line supplied from the display controlling section 11, the display signal driver 71 divides the image signal into the plurality of groups, and supplies each group as the display signal Vsig to the selection switch section 80. In this example, the image signal of one display horizontal line is grouped into the six image signals each corresponding to one pixel, thereby constituting the display signal Vsig. In other words, in each display signal Vsig, the six image signals each corresponding to one pixel are time-divisionally multiplexed. Further, the display signal drive 71 generates the switch control signals Vsel1 to Vsel6 which are necessary for demultiplexing the image signal (pixel signal Vpix) of each pixel from the multiplexed display signal Vsig, and supplies the image switch control signals Vsel1 to Vsel6 and the display signal Vsig to the selection switch section 80.

Further, the display signal driver 71 has a function to generate a precharge switch signal Vsw having different logic levels in the horizontal blanking period and in the display period, and to supply the precharge switch signal Vsw to the selection switch section 80. Therefore, the display signal driver 71 controls the selection switch section 80 to supply the common signal Vcom to all the pixel signal lines 43 in the horizontal blanking period prior to the display period.

The selection switch section 80 demultiplexes the pixel signal Vpix which is time-divisionally multiplexed in the display signal Vsig from the display signal Vsig based on the display signal Vsig and the switch control signals Vsel1 to Vsel6 which are supplied from the display signal driver 71, and supplies the pixel signal Vpix to each display cell 40 as the target of the display drive in the display section 30 with the sensor.

Further, in the horizontal blanking period prior to the display period, the selection switch section 80 supplies the common signal Vcom to all the pixel signal lines 43 based on the precharge switch signal Vsw supplied from the display signal driver 71. As illustrated in FIG. 12, the selection switch section 80 includes a precharge switch section 86. The precharge switch section 86 is composed of a plurality of switches. In the precharge switch section 86, one end of the switch and one end of the other switch are connected to each other, and supplied with the common signal Vcom from the common signal driver 12. The other ends of the switches are connected to the pixel signal lines 43 of the display section 30 with the sensor, respectively. All the switches of the precharge switch section 86 are controlled to turn on and off by the precharge switch signal Vsw supplied from the display signal driver 71. With this structure, the precharge switch section 86 supplies the common signal Vcom to all the pixel signal lines 43 in response to the precharge switch signal Vsw.

In addition, for example, the selection switch section 80 is formed on the same substrate as the display section 30 with the sensor. In that case, all the switches of the selection switch section 80 are composed of the thin film transistors (TFTs) or the like, and are composed of the analogue switches or the like using these TFTs.

Here, the precharge switch section 86 corresponds to a specific example of the "plurality of second switches" in the present application.

Operation and Action
Detailed Operation

Figure 13:
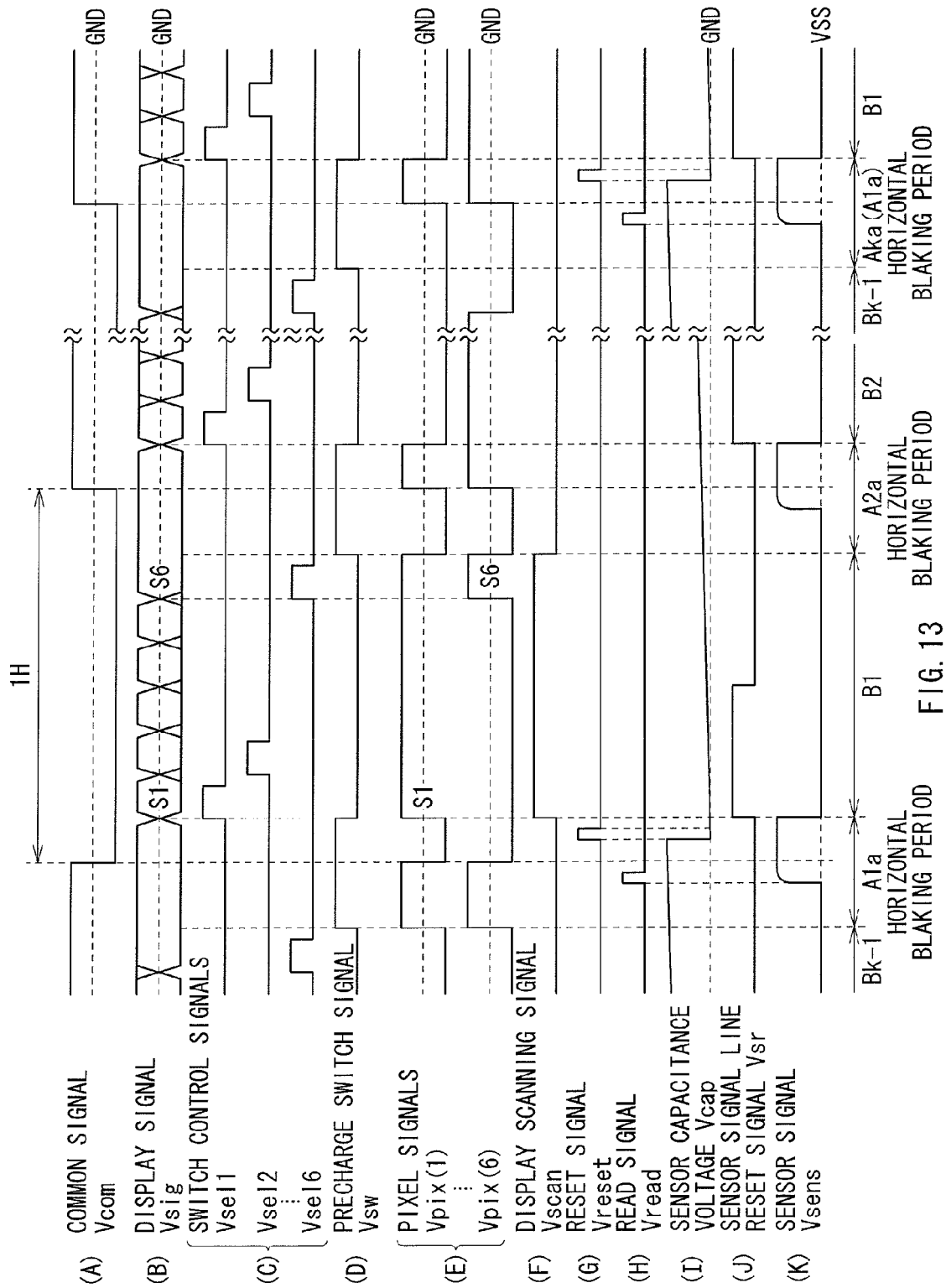
FIG. 13 is a timing waveform diagram illustrating an operational example of the display device with the touch sensor illustrated in FIG. 11.

FIG. 13 illustrates the timing diagram of the display operation and the touch sensor operation of the display device 70 with the touch sensor. In FIG. 13, Part A indicates the waveform of the common signal Vcom, Part B indicates the waveform of the display signal Vsig, Part C indicates the waveforms of the switch control signals Vsel1 to Vsel6, Part D indicates the waveform of the precharge switch signal Vsw, Part E indicates the waveforms of the pixel signals Vpix, Part F indicates the waveform of the display scanning signal Vscan, Part G indicates the waveform of the reset signal Vreset, Part H indicates the waveform of the read signal Vread, Part I indicates the waveform of the sensor capacitance voltage Vcap, Part J indicates the waveform of the sensor signal line reset signal Vsr, and Part K indicates the waveform of the sensor signal Vsens. Here, all the switches of the precharge switch section 86 in the selection switch section 80 turn on when the precharge switch signal Vsw is at the high level.

The operation in the display period Bn of the display device 70 with the touch sensor is the same as the corresponding operation (periods B1, B2, . . . , Bk-1 in FIG. 5) in the display device 10 with the touch sensor of the first embodiment. Therefore, the operation in the horizontal blanking period Ana (n is a natural number of k or less) will be described below.

Horizontal Blanking Period A1a

First, the display device 70 with the touch sensor precharges the pixel signal lines 43, resets the sensor cells 50 constituting the certain sensor horizontal line, and starts charging the capacitors 55. Specifically, first, the display scanning section 13 reduces, from the high level to the low level, the level of the display scanning signal Vscan of the display horizontal line displayed in the last display period Bk-1 (not illustrated in the figure), turns off the transistors 44 of all the display cells 40, thereby separating away the pixel signal lines 43 from all the liquid crystal element 45. The display signal driver 71 sets all the switch control signals Vsel1 to Vsel6 to the low level (Part C of FIG. 13), and increases, from the low level to the high level, the level of the precharge switch signal Vsw (Part D of FIG. 13). Therefore, in the selection switch section 80, all the switches of the switch group 25 turn off, all the switches of the precharge switch section 86 are turned on, and the common signal Vcom is supplied as the pixel signal Vpix to the pixel signal lines 43 to precharge the pixel signal lines 43 (Part E of FIG. 13). Next, the common signal driver 12 inverts the common signal Vcom (Part A of FIG. 13), and prepares for the next display period. Also at this time, the common signal Vcom is continuously supplied to all the pixel signal lines 43 (Part E of FIG. 13). The sensor scanning section 14 outputs the reset pulse as the reset signal Vreset to the certain horizontal line (Part G of FIG. 13). At this time, the transistor 56 of the sensor cell 50 turns on only during the time corresponding to the reset pulse width, the capacitor 55 is discharged, and the sensor capacitance voltage Vcap becomes 0V (Part I of FIG. 13). When the transistor 56 turns off again after the capacitor 55 is discharged, charging to the capacitor 55 is started with that current, and the sensor capacitance voltage Vcap starts increasing (Part I of FIG. 13). Thereafter, the sensor scanning section 14 increases, from the low level to the high level, the level of the sensor signal line reset signal Vsr (Part J of FIG. 13). Thus, the transistor 63 of the photo-reception signal receiver 60 turns on, and the power source VSS is connected to the sensor signal line 53, thereby allowing the sensor signal Vsens of the sensor signal line 53 to be initialized (Part K of FIG. 13).

Horizontal Blanking Period Ana

Next, in the horizontal blanking period A2a, the display device 70 with the touch sensor precharges the pixel signal lines 43, resets the sensor cells 50 constituting the sensor horizontal line different from that of the horizontal blanking period A1a, and starts charging the capacitors 55. The operation is the same as in the horizontal blanking period A1a except that the sensor horizontal line is different.

Thereafter, the display device 70 with the touch sensor alternately repeats the horizontal blanking period Ana and the display period Bn, while sequentially selecting the sensor horizontal line and the display horizontal line.

Horizontal Blanking Period Aka (A1a)

Finally, the display device 70 with the touch sensor precharges the pixel signal lines 43 again, and reads the sensor capacitance voltage Vcap of the capacitors 55 constituting the sensor horizontal line which has started charging in the horizontal blanking period A1a. Specifically, first, the display scanning section 13 reduces, from the high level to the low level, the level of the display scanning signal Vscan of the display horizontal line displayed in the last display period Bk-1 (not illustrated in the figure), and separates away the pixel signal lines 43 from all the liquid crystal elements 45. The display signal driver 71 sets all the switch control signals Vsel1 to Vsel6 to the low level (Part C of FIG. 13), and increases, from the low level to the high level, the level of the precharge switch signal Vsw (Part D of FIG. 13). Therefore, in the selection switch section 80, all the switches of the switch group 25 turn off, all the switches of the precharge switch section 86 turn on, the common signal Vcom is supplied as the pixel signal Vpix to the pixel signal line 43 (Part E of FIG. 13), and the pixel signal line 43 is precharged in the same manner as in the horizontal blanking period A1a. The sensor scanning section 14 outputs the read pulse as the read signal Vread (part H of FIG. 13). At this time, the transistor 58 of the sensor cell 50 turns on only during the time corresponding to the read pulse width. The transistor 57 performs the source follower operation by using, as the bias current, the current of the constant current source 61 of the photo-reception signal receiver 60, and the voltage corresponding to the sensor capacitance voltage Vcap of the capacitor 55 is output as the sensor signal Vsens to the sensor signal line 53 (Part K of FIG. 13). After the sensor signal Vsens is amplified by the amplifier 62 of the photo-reception signal receiver 60, the sensor signal Vsens is supplied as the photo-reception signal Vrec to the photo-reception signal holding section 16, and stored in the field memory.

In addition, in this example, the horizontal blanking period Aka also functions as the horizontal blanking period A1a in the next sensor operation of this sensor horizontal line. In this manner, by repeating the series of operations of the periods A1a to Aka (A1a), the display device 70 with the touch sensor continuously performs the display operation and the touch sensor operation.

Like the display device 10 with the touch sensor of the first embodiment, the display device 70 with the touch sensor of the second embodiment precharges the pixel signal line 43 in the horizontal blanking period, and the level of the pixel signal Vpix is set to be the same when the sensor cell 50 is reset by being supplied with the reset signal Vreset, and when the sensor capacitance voltage Vcap is read by being supplied with the read signal Vread (Part E of FIG. 13). Therefore, even when the crosstalk noise from the adjacent wiring such as the pixel signal line 43 is superimposed on the capacitance element voltage Vcap of the capacitor 55 in the sensor cell 50, it may be possible to minimize the deterioration of the touch sensor accuracy.

Effects

As described above, in the second embodiment, since the precharge switch section 86 is provided in the selection switch section 80, separately from the switch group 25, and the signal input to the precharge switch section 86 may be used for precharging, it may be possible to set the precharging with a higher degree of freedom, for example, the voltage may be freely set.

In the second embodiment, since the common signal Vcom is used as the signal used for the precharging, a new signal generating circuit such as a power source and an amplifier is not necessary for precharging, and the circuit structure may be simple.

Other effects are the same as the case of the first embodiment.

Modification 2-1

Figure 14:
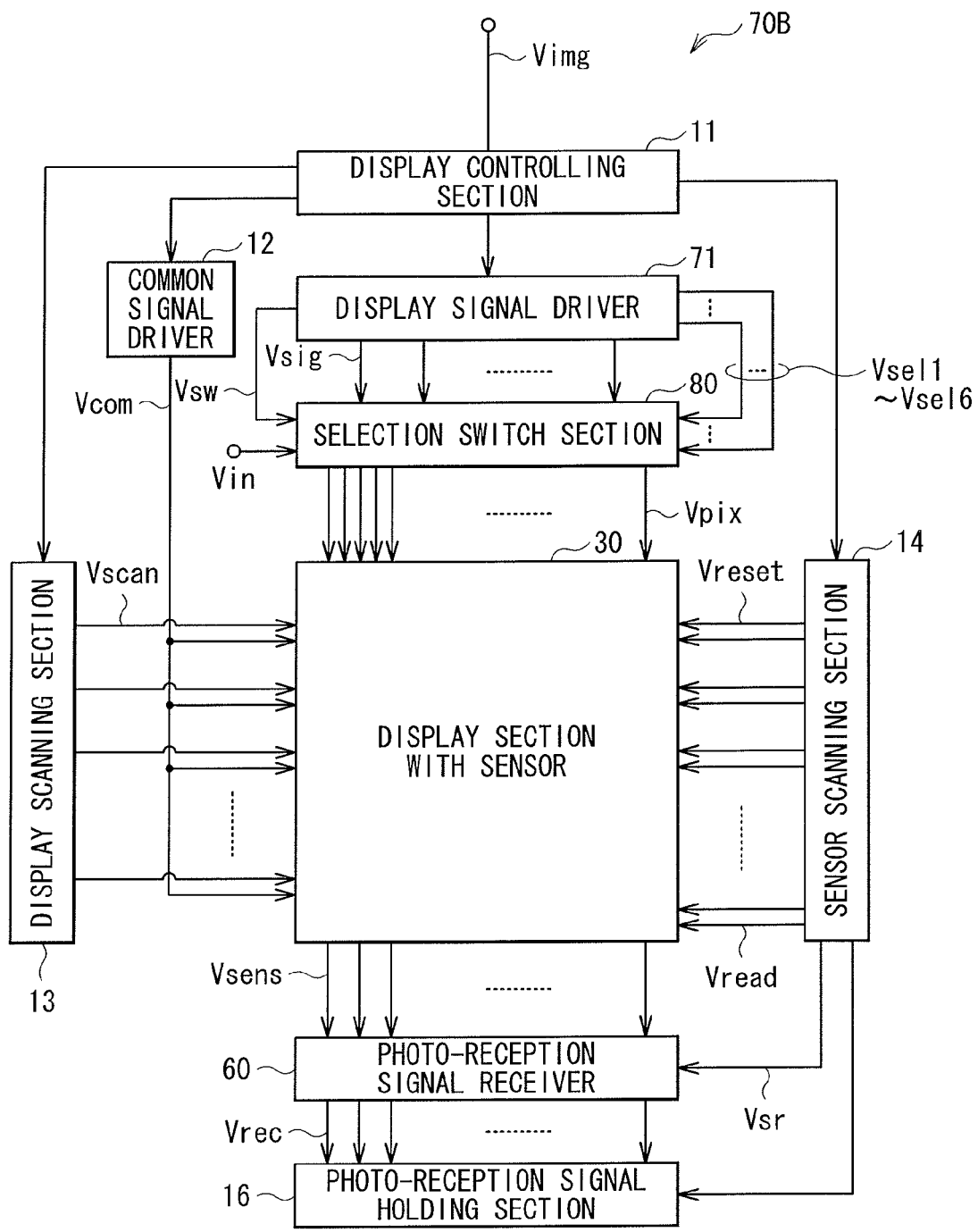
FIG. 14 is a block diagram illustrating a structural example of the display device with the touch sensor according to a modification of the second embodiment.

In the second embodiment, although the common signal Vcom is used as the signal used for precharging, it is not limited to this. Alternatively, a signal supplied from the external (external input signal Vin) may be used. A circuit structural example of this case is illustrated in FIG. 14. As the external input signal Vin, the signal having the same voltage level when the sensor cell 50 is reset by being supplied with the reset signal Vreset, and when the sensor capacitance voltage Vcap is read by being supplied with the read signal Vred may be used. The signal may be, for example, a direct-current power source, or a pulse signal. As the pulse signal, a signal synchronized with the common signal Vcom may be used.

3. Third Embodiment

Next, a display device with a touch sensor according to a third embodiment will be described. In the third embodiment, without the selection switch section, the display signal driver directly outputs the pixel signal Vpix, and the display device with the sensor is driven. In addition, like reference numerals as in the display device with the touch sensor according to the first embodiment and the second embodiment will be used to indicate substantially identical components, and therefore the description is appropriately omitted.

Structural Example

Figure 15:
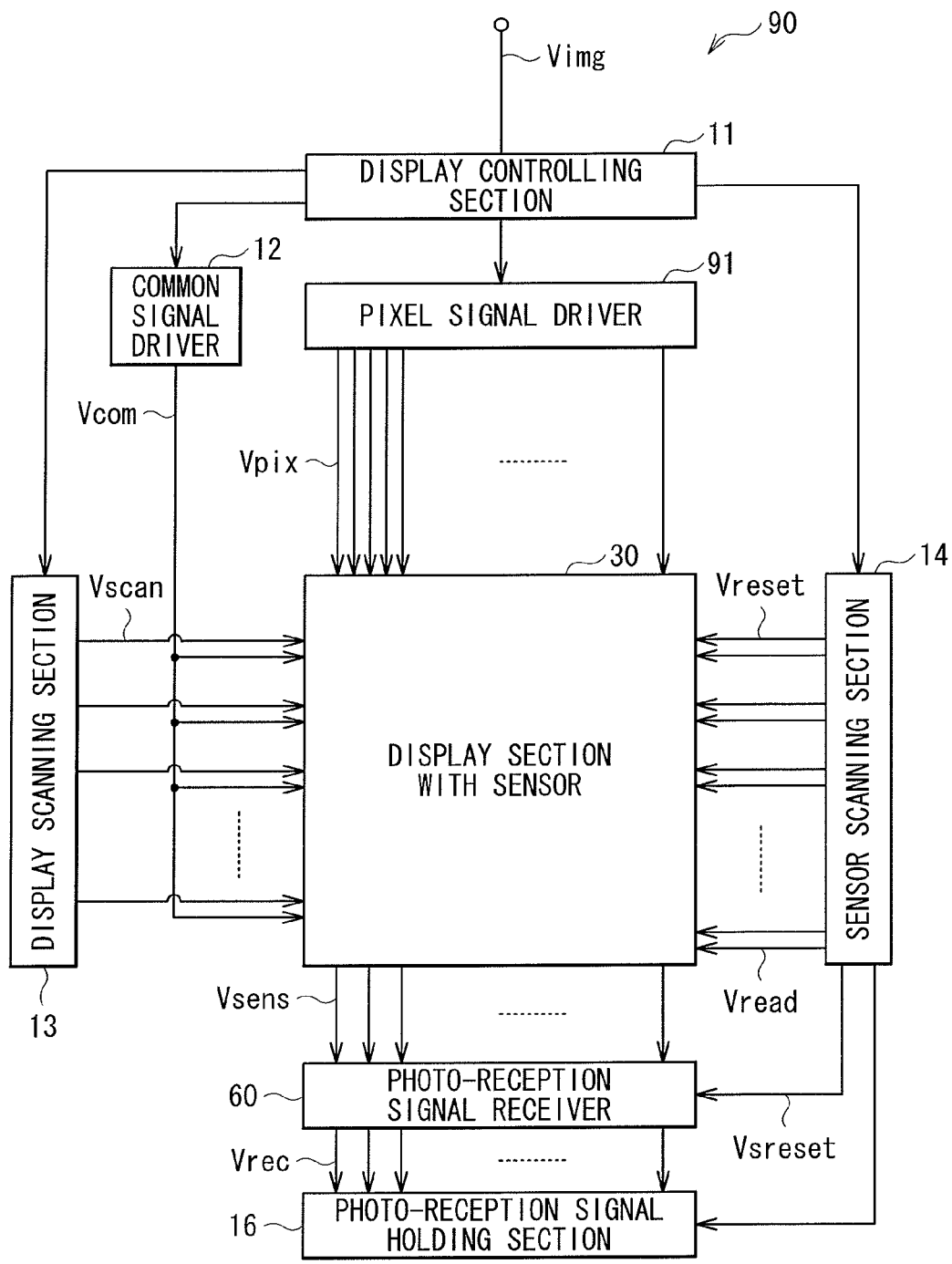
FIG. 15 is a block diagram illustrating a structural example of the display device with the touch sensor according to a third embodiment.

FIG. 15 illustrates a structural example of a display device 90 with a touch sensor according to a third embodiment. In place of the selection switch section, the display device 90 with the touch sensor includes a pixel signal driver 91 directly driving the display section 30 with the sensor. Other structures are the same as those of the first embodiment and the second embodiment (FIGS. 1 and 11).

In the display period, based on the image signal of one display horizontal line supplied from the display controlling section 11, the pixel signal driver 91 generates the pixel signal Vpix, and supplies the pixel signal Vpix to each display cell 40 as the target of the display drive in the display section 30 with the sensor. Further, in the horizontal blanking period, the pixel signal driver 91 has a function to generate the predetermined precharge voltage Vpcg, and supply the precharge voltage Vpcg to all the pixel signal lines 43 in the display section 30 with the sensor.

Operations and Actions

Detailed Operation

Figure 16:
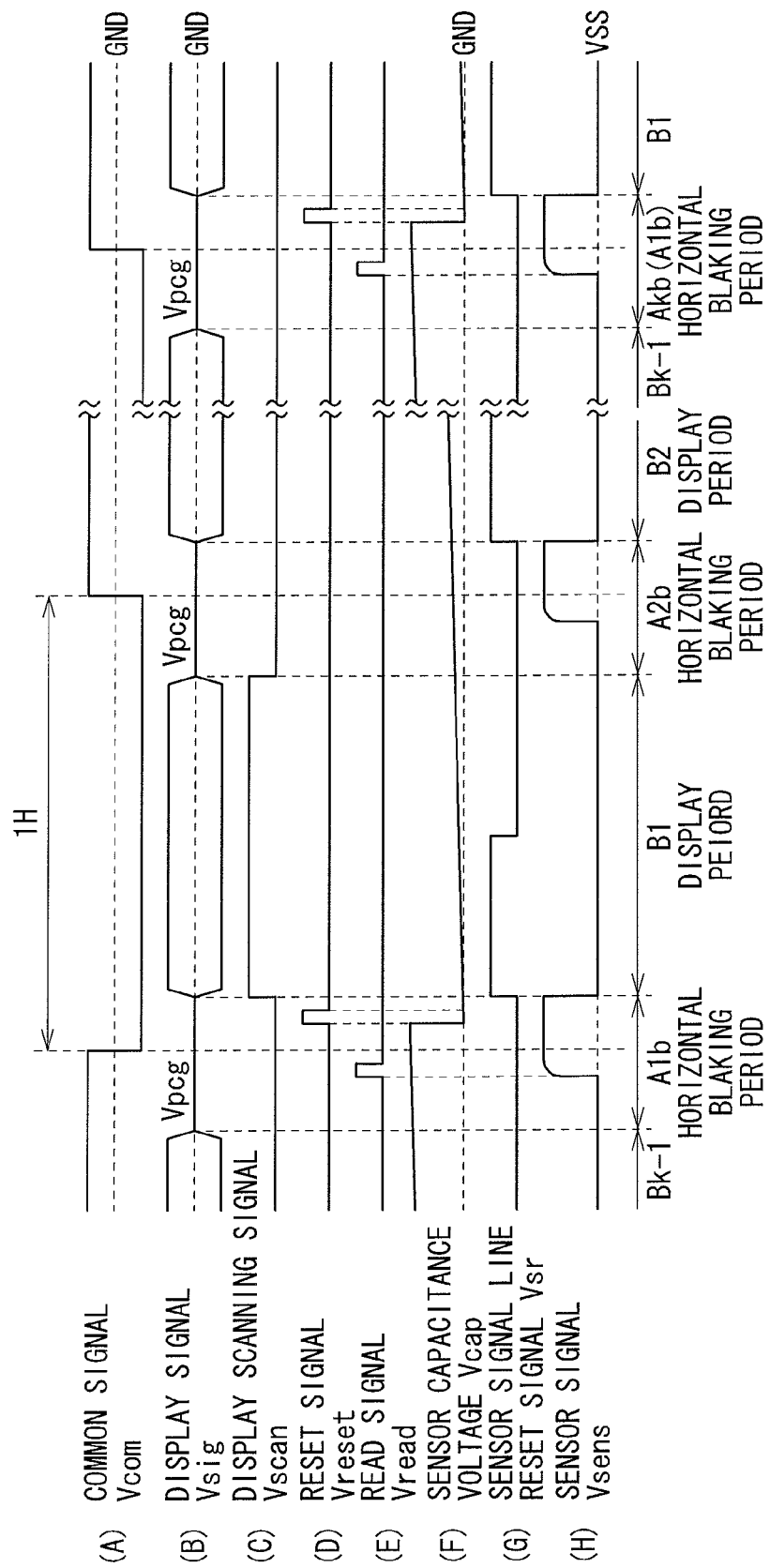
FIG. 16 is a timing waveform diagram illustrating an operational example of the display device with the touch sensor illustrated in FIG. 15.

FIG. 16 illustrates the timing diagram of the display operation and the touch sensor operation of the display device 90 with the touch sensor. In FIG. 16, Part A indicates the waveform of the common signal Vcom, Part B indicates the waveform of the pixel signal Vpix, Part C indicates the waveform of the display scanning signal Vscan, Part D indicates the waveform of the reset signal Vreset, Part E indicates the waveform of the read signal Vread, Part F indicates the waveform of the sensor capacitance voltage Vcap, Part G indicates the waveform of the sensor signal line reset signal Vsr, and Part H indicates the waveform of the sensor signal Vsens.

The operation in the display period Bn in the display device 90 with the touch sensor is the same as the corresponding operation (periods B1, B2, ..., Bk-1 of FIG. 5) in the display device 10 with the touch sensor of the first embodiment. Therefore, the operation in the horizontal blanking period Anb (n is a natural number of k or less) will be described below.

Horizontal Blanking Period A1b

First, the display device 90 with the touch sensor resets the sensor cells 50 constituting the certain sensor horizontal line, and starts charging the capacitors 55. Specifically, first, the display scanning section 13 reduces, from the high level to the low level, the level of the display scanning signal Vscan of the display horizontal line displayed in the last display period Bk-1 (not illustrated in the figure), turns off the transistors 44 of all the display cells 40, thereby separating away the pixel signal lines 43 from all the liquid crystal element 45. The pixel signal driver 91 supplies the predetermined precharge voltage Vpcg (here, 0V) as the pixel signal Vpix to all the pixel signal lines 43, and precharges the pixel signal lines 43

(Part B of FIG. 16). Next, the common signal driver 12 inverts the common signal Vcom (Part A of FIG. 16), and prepares for the next display period. Also at this time, the common signal Vcom is continuously supplied to all the pixel signal lines 43 (Part B of FIG. 16). The sensor scanning section 14 outputs the reset pulse as the reset signal Vreset to the certain sensor horizontal line (Part D of FIG. 16). At this time, the transistor 56 of the sensor cell 50 turns on only during the time corresponding to the reset pulse width, the capacitor 55 is discharged, and the sensor capacitance voltage Vcap becomes 0V (Part F of FIG. 16). When the transistor 56 turns off again after the capacitor 55 is discharged, charging to the capacitor 55 is started with that current, and the sensor capacitance voltage Vcap starts increasing (Part F of FIG. 16). Thereafter, the sensor scanning section 14 increases, from the low level to the high level, the level of the sensor signal line reset signal Vsr (Part G of FIG. 16). Thus, the transistor 63 of the photo-reception signal receiver 60 turns on, and the power source VSS is connected to the sensor signal line 53, thereby allowing the sensor signal Vsens of the sensor signal line 53 to be initialized (Part H of FIG. 16).

Horizontal Blanking Period Anb

Next, in the horizontal blanking period A2b, the display device 90 with the touch sensor precharges the pixel signal lines 43, resets the sensor cells 50 constituting the sensor horizontal line different from that of the horizontal blanking period A1b, and starts charging the capacitors 55. The operation is the same as in the horizontal blanking period A1b except that the sensor horizontal line is different.

Thereafter, the display device 90 with the touch sensor alternately repeats the horizontal blanking period Anb and the display period Bn, while sequentially selecting the sensor horizontal line and the display horizontal line Horizontal Blanking Period Akb (A1b)

Finally, the display device 90 with the touch sensor precharges the pixel signal lines 43, and reads the sensor capacitance voltage Vcap of the capacitors 55 constituting the sensor horizontal line which has started charging in the horizontal blanking period A1b. Specifically, first, the display scanning section 13 reduces, from the high level to the low level, the level of the display scanning signal Vscan of the display horizontal line displayed in the last display period Bk-1 (not illustrated in the figure), and separates away the pixel signal lines 43 from all the liquid crystal element 45. In the same manner as in the horizontal blanking period A1b, the pixel signal driver 91 supplies the predetermined precharge voltage Vpcg (here, 0V) as the pixel signal Vpix to all the pixel signal lines 43, and precharges all the pixel signal lines 43 (Part B of FIG. 16). The sensor scanning section 14 outputs the read pulse as the read signal Vread (Part D of FIG. 16). At this time, the transistor 58 of the sensor cell 50 turns on only during the time corresponding to the read pulse width. The transistor 57 then performs the source follower operation by using, as the bias current, the current of the constant current source 61 of the photo-reception signal receiver 60, and the voltage corresponding to the sensor capacitance voltage Vcap of the capacitor 55 is output as the sensor signal Vsens to the sensor signal line 53 (Part H of FIG. 16). After the sensor signal Vsens is amplified by the amplifier 62 of the photo-reception signal receiver 60, the sensor signal Vsens is supplied as the photo-reception signal Vrec to the photo-reception signal holding section 16, and stored in the field memory.

In addition, in this example, the horizontal blanking period Akb also functions as the horizontal blanking period A1b in the next sensor operation of this sensor horizontal line. In this manner, by repeating the series of operations of the periods A1b to Akb (A1b), the display device 90 with the touch sensor continuously performs the display operation and the touch sensor operation.

Like the display device with the touch sensor of the first embodiment and the second embodiment, the display device 90 with the touch sensor of the third embodiment precharges the pixel signal line 43 in the horizontal blanking period, and sets the voltage level of the pixel signal Vpix to be the same when the sensor cell 50 is reset by being supplied with the reset signal Vreset, and when the sensor capacitance voltage Vcap is read by being supplied with the read signal Vread (Part B of FIG. 16). Therefore, even when the crosstalk noise from the adjacent wiring such as the pixel signal line 43 is superimposed on the capacitor voltage Vcap of the capacitor 55 in the sensor cell 50, it may be possible to minimize the deterioration of the touch sensor accuracy.

Effects

As described above, in the third embodiment, since the pixel signal driver 91 generates the pixel signal Vpix including the predetermined precharge voltage Vpcg, the selection switch section is not necessary, and it may be possible to reduce the number of components. Other effects are the same as the first embodiment.

4. Application Examples

Next, a description will be made on application examples of the display device with the touch sensor described in the foregoing embodiments and their modifications with reference to FIGS. 17 to 21G. The display device with the touch sensor of the foregoing embodiments and the like are applicable to electronic units in various fields, such as a television device, a digital camera, a notebook personal computer, a mobile terminal device such as a mobile phone, and a video camera. In other words, the display device with the touch sensor of the foregoing embodiments and the like is applicable to the electronic units in the various fields, in which a video signal input from outside, or a video signal generated inside the display device is displayed as an image or a video.

First Application Example

Figure 17:
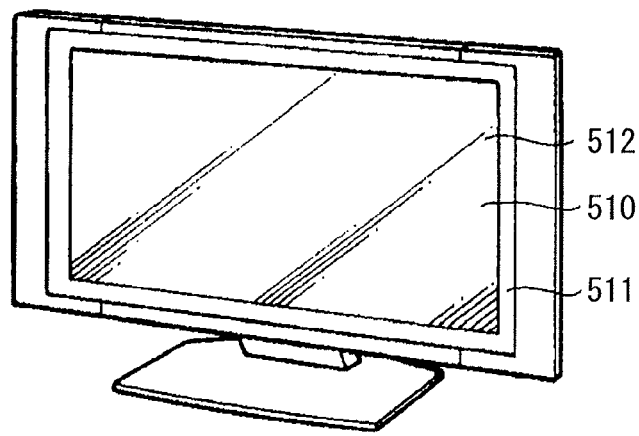
FIG. 17 is a perspective view illustrating the appearance structure of a first application example in the display device with the touch sensor to which the first embodiment to the third embodiment are applied.

FIG. 17 illustrates an appearance of a television device to which the display device with the touch sensor of the foregoing embodiments and the like is applied. The television device includes, for example, a video display screen section 510 including a front panel 511 and a filter glass 512. The video display screen section 510 is composed of the display device with the touch sensor of the foregoing embodiments and the like.

Second Application Example

Figure 18A:
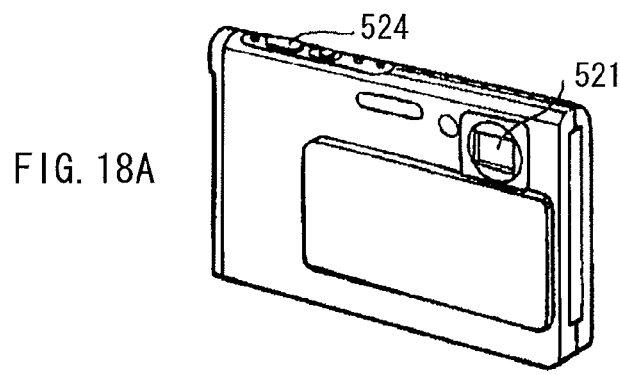
FIGS. 18A and 18B are perspective views illustrating the appearance structure of a second application example.
Figure 18B:
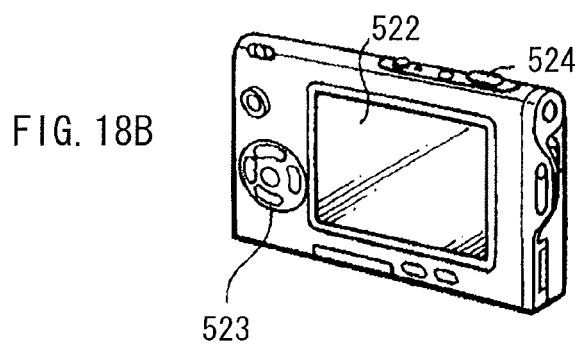

FIGS. 18A and 18B illustrate an appearance of a digital camera to which the display device with the touch sensor of the foregoing embodiments and the like is applied. The digital camera includes, for example, a light emitting section 521 for a flash, a display section 522, a menu switch 523, and a shutter button 524. The display section 522 is composed of the display device with the touch sensor of the foregoing embodiments and the like.

Third Application Example

Figure 19:
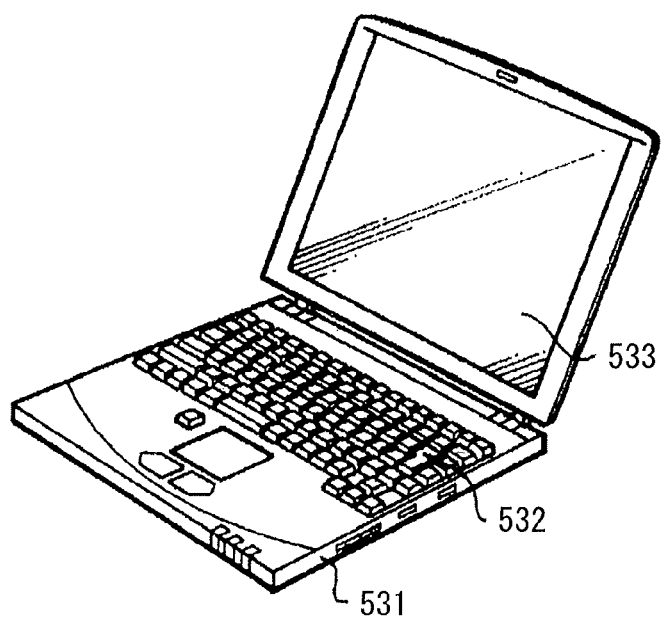
FIG. 19 is a perspective view illustrating the appearance structure of a third application example.

FIG. 19 illustrates an appearance of a notebook personal computer to which the display device with the touch sensor of the foregoing embodiments and the like is applied. The notebook personal computer includes, for example, a main body 531, a keyboard 532 for operation of inputting characters and the like, and a display section 533 for displaying an image. The display section 533 is composed of the display device with the touch sensor of the foregoing embodiments and the like.

Fourth Application Example

Figure 20:
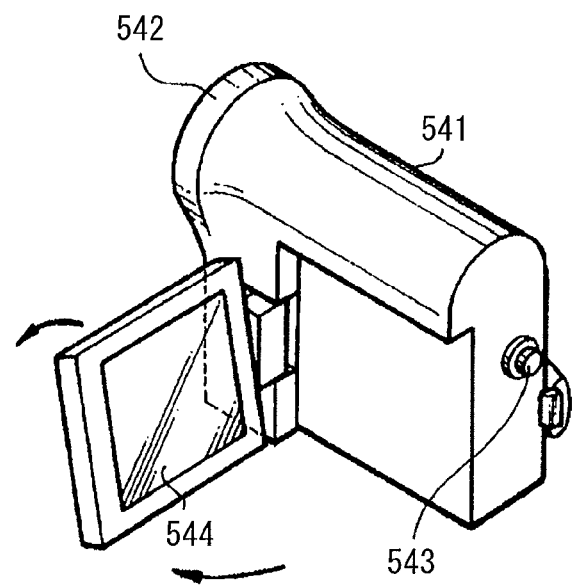
FIG. 20 is a perspective view illustrating the appearance structure of a fourth application example.

FIG. 20 illustrates an appearance of a video camera to which the display device with the touch sensor of the foregoing embodiments and the like is applied. The video camera includes, for example, a main body 541, a lens 542 for capturing an object provided on the front side face of the main body 541, a start/stop switch 543 in capturing, and a display section 544. The display section 544 is composed of the display device with the touch sensor of the foregoing embodiments and the like.

Fifth Application Example

FIGS. 21A to 21G illustrate an appearance of a mobile phone to which the display device with the touch sensor of the foregoing embodiments and the like is applied. In the mobile phone, for example, an upper package 710 and a lower package 720 are joined by a joint section (hinge section) 730. The mobile phone includes a display 740, a sub-display 750, a picture light 760, and a camera 770. The display 740 or the sub-display 750 is composed of the display device with the touch sensor of the foregoing embodiments and the like.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A display device with an image pickup function comprising:
   a plurality of pixel signal lines each supplied with a pixel signal;
   a plurality of display pixels each performing a display operation based on the pixel signal; and
   a plurality of image pickup elements each including a photo-detector and a capacitor, the photo-detector generating a current of a magnitude corresponding to a photo-detection amount, the capacitor performing a discharging operation which follows a charging operation with the current from the photo-detector to output a charged voltage for a read operation,
   wherein a voltage level of the pixel signal line during the discharging operation is equal to a voltage level of the pixel signal line during the reading operation,
   wherein the plurality of display pixels are driven in a mode of horizontal-line sequential display, and
   the discharging operation, in a set of operations including the discharging operation, the charging operation and the reading operation, is performed during one of two horizontal blanking periods, and the reading operation, in the same set of operations, is performed during the other of the two horizontal blanking periods, each of the two horizontal blanking periods appearing prior to or subsequent to a display operation period which continues over one or a plurality of horizontal lines of the display pixels,
   the display device further comprising a plurality of first switching elements which, in the display operation period, demultiplexes a time-divisionally multiplexed signal generated by time-division multiplexing of the pixel signals into the individual pixel signals, and supplies the individual pixel signals to the respective pixel signal lines,
   wherein the time-divisionally multiplexed signal includes a period of a predetermined-level voltage in a timing position which is synchronized with the horizontal blanking period, and
   the predetermined-level voltage is applied, in common, to all the plurality of pixel signal lines through turning on all the first switching elements, just in the horizontal blanking period.

2. A display device with an image pickup function comprising:
   a plurality of pixel signal lines each supplied with a pixel signal;
   a plurality of display pixels each performed a display operation based on the pixel signal; and
   a plurality of image pickup elements each including a photo-detector and a capacitor, the photo-detector generating a current of a magnitude corresponding to a photo-detection amount, the capacitor performing a discharging operation which follows a charging operation with the current from the photo-detector to output a charged voltage for a read operation,
   wherein a voltage level of the pixel signal line during the discharging operation is equal to a voltage level of the pixel signal line during the reading operation,
   wherein the plurality of display pixels are driven in a mode of horizontal-line sequential display, and
   the discharging operation, in a set of operations including the discharging operation, the charging operation and the reading operation, is performed during one of two horizontal blanking periods, and threading operation, in the same set of operations, is performed during the other of the two horizontal blanking periods, each of the two horizontal blanking periods appearing prior to or subsequent to a display operation period which continues over one or a plurality of horizontal lines of the display pixels,
   the display device further comprising a plurality of first switching elements which, in the display operation period, demultiplexes a time-divisionally multiplexed signal generated by time-division multiplexing of the pixel signals into the individual pixel signals, and supplies the individual pixel signals to the respective pixel signal lines,
   the display device further comprising a plurality of second switching elements each turning on/off a supply of a predetermined signal, wherein
   the predetermined-level voltage is applied, in common, to all the plurality of pixel signal lines through turning off all the first switching elements, and through turning on all the second switching elements to supply the predetermined signal to all the plurality of pixel signal lines, just in the horizontal blanking period.

3. The display device with the image pickup function according to claim 2, wherein
   the plurality of display pixels are configured with use of liquid crystal elements which are driven in a polarity-inversion drive mode, the mode allowing a polarity of a pixel application voltage determined by both the pixel signal and a common signal to be inverted at established intervals, and
   the common signal is utilized as the predetermined signal.

4. The display device with the image pickup function according to claim 2, wherein a DC level signal of a constant voltage level is utilized as the predetermined signal.

* * * * *